US009872506B2

(12) United States Patent
Annema et al.

(10) Patent No.: US 9,872,506 B2
(45) Date of Patent: Jan. 23, 2018

(54) SYSTEM AND METHOD FOR REMOVING A THIGH BONE FROM A DEFEATHERED WHOLE LEG POULTRY PRODUCT

(71) Applicant: MAREL STORK POULTRY PROCESSING B.V., Boxmeer (NL)

(72) Inventors: Heinze Annema, Gemert (NL); Richard Gerard Johan Drabbels, Venray (NL); Roger Pierre Hubertus Maria Claessens, Nijmegen (NL); Stefan Christianus Wilhelmus Martinus Van Den Heuvel, Oeffelt (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 15/319,779

(22) PCT Filed: Jun. 11, 2015

(86) PCT No.: PCT/NL2015/050429
§ 371 (c)(1),
(2) Date: Dec. 17, 2016

(87) PCT Pub. No.: WO2015/194944
PCT Pub. Date: Dec. 23, 2015

(65) Prior Publication Data
US 2017/0127692 A1     May 11, 2017

(30) Foreign Application Priority Data

Jun. 18, 2014   (NL) ..................................... 2013017
Jun. 18, 2014   (NL) ..................................... 2013018
Jun. 18, 2014   (NL) ..................................... 2013019

(51) Int. Cl.
    *A22C 21/00*      (2006.01)

(52) U.S. Cl.
    CPC ...... *A22C 21/0092* (2013.01); *A22C 21/0023* (2013.01); *A22C 21/0053* (2013.01); *A22C 21/0076* (2013.01)

(58) Field of Classification Search
    CPC .... A47J 43/0705; A47J 43/0755; A47J 42/04; B01F 13/002; B01F 7/164; A22C 21/00;
(Continued)

(56) References Cited

U.S. PATENT DOCUMENTS 3,364,615 A    1/1968   Brown et al.
3,615,692 A    10/1971   Lovell
(Continued)

FOREIGN PATENT DOCUMENTS

EP     0 442 554 A1    8/1991
EP     0 763 326 A1    3/1997
(Continued)

*Primary Examiner* — Richard Price, Jr.
(74) *Attorney, Agent, or Firm* — Birch, Stewart, Kolasch & Birch, LLP

(57) ABSTRACT

A system and a method for removing a thigh bone from a defeathered whole leg poultry product includes providing a leg product including a thigh, a drumstick and a knee joint. In the leg product, a transverse cut has been provided at the knee joint transverse to the thigh bone and the tibia bone, which extends from one side of the leg product to a cut end so that the thigh and the drumstick are connected to each other, by which transverse cut a drumstick side cut plane and a thigh side cut plane are created. While keeping the thigh and the drumstick connected to each other, changing the angle between the thigh and thereby exposing the thigh side cut plane, while keeping the thigh meat and the drumstick connected to each other, removing the thigh bone from the thigh meat via the thigh side cut plane.

24 Claims, 15 Drawing Sheets

(58) Field of Classification Search
CPC .......... A22C 21/0046; A22C 21/0053; A22C 21/0069; A22C 21/0076; A22C 21/0084
USPC ... 452/52, 53, 106, 107, 135, 136, 149–153, 452/166, 167, 169, 170, 177, 180
See application file for complete search history.

(56) References Cited

U.S. PATENT DOCUMENTS

| | | | |
|---|---|---|---|
| 4,993,113 A | 2/1991 | Hazenbroek | |
| 5,015,213 A * | 5/1991 | Hazenbroek | A22C 21/0023 452/149 |
| 5,173,077 A * | 12/1992 | van den Nieuwelaar | A22B 5/0058 452/135 |
| 5,176,562 A | 1/1993 | Martin et al. | |
| 5,228,881 A | 7/1993 | Sekiguchi | |
| 5,713,787 A * | 2/1998 | Schoenmakers | A22C 17/004 452/136 |
| 5,961,383 A * | 10/1999 | Janssen | A22C 21/0076 452/135 |
| 5,976,004 A * | 11/1999 | Hazenbroek | A22C 21/0084 452/136 |
| 6,322,438 B1 * | 11/2001 | Barendregt | A22C 21/0023 452/155 |
| 7,232,365 B2 * | 6/2007 | Annema | A22C 21/0084 452/167 |
| 8,277,294 B2 * | 10/2012 | Van Hillo | A22C 21/0076 452/148 |
| 8,961,274 B1 * | 2/2015 | den Boer | A22C 21/066 452/148 |

FOREIGN PATENT DOCUMENTS

| | | |
|---|---|---|
| EP | 1 639 898 A1 | 3/2006 |
| JP | 2-283230 A | 11/1990 |
| NL | 1001226 C | 3/1997 |
| WO | WO 93/13671 A2 | 7/1993 |
| WO | WO 00/59311 A2 | 10/2000 |
| WO | WO 03/039262 A2 | 5/2003 |

\* cited by examiner

SYSTEM AND METHOD FOR REMOVING A THIGH BONE FROM A DEFEATHERED WHOLE LEG POULTRY PRODUCT

BACKGROUND OF THE INVENTION

The invention pertains to a system and method for removing a thigh bone from a defeathered whole leg poultry product.

Poultry thigh meat is a generally high quality, tasty meat type that is highly valued by consumers. With the increased popularity of this type of poultry meat, the demand for boneless poultry thigh meat also increases.

In automated poultry processing plants, carcass parts are preferably processed while they are arranged in, on or at product carriers that bring the carcass parts to the processing stations in which the processing can take place. These carriers generally engage the carcass part by the legs in the vicinity of the tarsal joints, such that the carcass or carcass part is suspended from the carrier.

When it comes to removing the thigh bone in order to obtain boneless thigh meat, in automated poultry processing plants this preferably takes place while the drumstick is still connected to the thigh. The combination of the drumstick and thigh is called "whole leg poultry product", even though the part of the leg from the tarsal joint to the foot and the foot itself have generally already been removed. The advantage of this is that the whole leg poultry product may be in a standard carrier during the thigh bone removal process, optionally even in the same carrier in which the carcass or carcass part was at the beginning of the process of dividing a chilled and eviscerated carcass into carcass parts. This means that transfer to a different carrier, either automatically or manually, can be reduced or even avoided.

WO00/59311 discloses two ways of removing the thigh bone from a whole leg poultry product while the whole leg product is engaged by its tarsal joint. However, it should be noticed that in this disclosure, the whole leg poultry product is no longer in a standard carrier (e.g. a standard division line carrier) when the thigh bone removal process is carried out. It has been transferred form such a standard carrier to a special, dedicated product support.

In the first method of removing the thigh bone that is disclosed in WO00/59311, a transverse cut is made at the knee joint, to sever the thigh bone and the drumstick bone from each other. Also, a longitudinal cut is made in the thigh meat, to expose the thigh bone. Then, the thigh bone is severed from the thigh meat between the knee joint and the hip joint end of the thigh bone by pulling the thigh bone sideways out of the thigh meat via the longitudinal cut in the thigh meat. During this pulling, the thigh meat remains connected to the hip side end of the thigh bone, so the thigh bone is more or less rotated about its hip side end. Then, as a final step, the connection between in the thigh meat and the thigh bone at the hip side end of the thigh bone is cut through.

It has been found that when carrying out this method, it is very hard to make the longitudinal cut in the thigh meat at the right location without cutting into the drumstick as well. Cutting into the drumstick is generally undesired, as the drumsticks are desired to have undamaged skin thereon. Also, the depth of the longitudinal cut in the thigh meat has to be very precise. If cut too deep, bone splinters may be found in the thigh meat and if cut too shallow, the thigh bone cannot be removed properly.

In the second method of removing the thigh bone that is disclosed in WO00/59311, the drumstick bone and the thigh bone remain connected to each other, but the thigh meat and the drumstick meat are severed from each other. In this method, then the thigh meat is scraped from the thigh bone in the direction from the knee joint to the hip side end of the thigh bone. In this method, quite a high pulling force is exerted on the tissues that connect the drumstick bone and the thigh bone, in particular when the thicker ends of the thigh bone, the condyles, pass through the scraper. There is a significant chance that the connection between the drumstick bone and the thigh bone breaks during the scraping, in particular when the connection has been damaged already somewhat when the thigh meat and the drumstick meat were severed. If the connection between the drumstick bone and the thigh bone breaks during the scraping, the thigh bone will not be removed from the thigh meat.

NL1001226 discloses a manual method for removing the thigh bone from a poultry thigh. In this manual method, a first incision is made in the lengthwise direction of the thigh, from the knee joint to the hip joint. Then a second incision is made in the knee joint, in a direction that is generally transverse to the longitudinal direction of the thigh bone. After these incisions are made, the thigh bone is removed by rotating the thigh bone sideways around the hip joint, by which rotation the thigh bone is taken out of the thigh meat via the first incision, which extends from the knee joint to the hip joint.

SUMMARY OF THE INVENTION

It is the object of the invention to provide an improved system and method for removing a thigh bone from a defeathered whole leg poultry product.

This object is achieved with a method for removing a thigh bone from a defeathered whole leg poultry product, wherein the method comprises the following steps:
  providing a defeathered whole leg poultry product which comprises:
    a thigh, which thigh comprises at least a thigh bone and thigh meat, wherein the thigh bone has a knee side end and a hip side end, and wherein the thigh bone comprises a knee side condyle,
    a drumstick, which drumstick comprises at least a tibia bone and drumstick meat, wherein the tibia bone has a knee side end and a tarsal joint side end,
    a knee joint, which knee joint comprises at least a connection between the thigh and the drumstick,
  in which defeathered whole leg poultry product, a transverse cut has been provided at the knee joint that extends generally in a direction transverse to the thigh bone and the tibia bone, which transverse cut extends from one side of the defeathered whole leg poultry product to a cut end which is located adjacent to the opposite side of the defeathered whole leg poultry product so that the thigh and the drumstick are connected to each other, by which transverse cut a drumstick side cut plane and a thigh side cut plane are created,
  while keeping the thigh and the drumstick connected to each other, changing the angle between the thigh and the drumstick by bending the defeathered whole leg poultry product at the knee joint and thereby opening the transverse cut at the knee joint and exposing the thigh side cut plane, during which bending the thigh meat remains on the thigh bone and the drumstick meat remains on the tibia bone,
  while keeping the thigh and the drumstick connected to each other and while keeping the transverse cut at the knee joint bent open, removing the thigh bone from the thigh meat via the thigh side cut plane of the transverse cut at the knee joint.

The poultry product that is provided in accordance with the method according to the invention, is a defeathered whole leg poultry product which comprises a thigh, a drumstick and a knee joint. In general, the leg part between the tarsal joint and the foot as well as the foot itself have already been removed. The thigh comprises at least a thigh bone and thigh meat. The thigh bone has a knee side end and a hip side end, and the thigh bone comprises a knee side condyle. Optionally, a hip side condyle is present at the hip side end of the thigh bone. At these condyles, the thigh bone is thicker than between these condyles.

The drumstick comprises at least a tibia bone and drumstick meat. The tibia bone has a knee side end and a tarsal joint side end. The knee joint comprises at least a connection between the thigh and the drumstick. Optionally, a knee cap is present as well.

In the defeathered whole leg poultry product as it is provided in accordance with the first step of the method according to the invention, a transverse cut has been provided at the knee joint. This transverse cut extends generally in a direction transverse to the thigh bone and the tibia bone, and from one side of the defeathered whole leg poultry product to a cut end. This cut end is located adjacent to the opposite side of the defeathered whole leg poultry product so that the thigh and the drumstick are still connected to each other. By the transverse cut, a drumstick side cut plane and a thigh side cut plane are created. The drumstick side cut plane and the thigh side cut plane are connected to each other adjacent to the cut end.

The defeathered whole leg poultry product is further sometimes in this application referred to as "the leg product" for easier reading. "The leg product" is the same as "the defeathered whole leg poultry product".

In the method according to the invention, after the leg product has been provided, the angle between the thigh and the drumstick is changed by bending the leg product at the knee joint while keeping the thigh and the drumstick connected to each other. Thereby, the transverse cut at the knee joint is opened and the thigh side cut plane is exposed. During this bending, the thigh meat remains on the thigh bone and the drumstick meat remains on the tibia bone.

In the next step of the method according to the invention, the thigh bone is removed from the thigh meat via the thigh side cut plane of the transverse cut at the knee joint while the thigh and the drumstick remain connected to each other and while the transverse cut at the knee joint is kept open.

When removing the thigh bone from the thigh meat via the thigh side cut plane of the transverse cut in the knee joint, the thigh bone travels generally in its lengthwise direction through the thigh side cut plane of the transverse cut in the knee joint. Preferable, the entire thigh bone passes through the thigh side cut plane of the transverse cut during the removal of the thigh bone from the thigh meat.

By removing the thigh bone via the thigh side cut plane, it is no longer necessary to make a longitudinal cut in the thigh meat along the thigh bone. In a preferred embodiment of the current invention, a longitudinal cut in the thigh meat along the thigh bone is not made.

Furthermore, by removing the thigh bone via the thigh side cut plane, the connection between the drumstick and the thigh is not or hardly subjected to pulling forces that originate from the removal of the thigh bone from the thigh meat. Therefore, the chance that this connection breaks is reduced. Furthermore, even if the connection between the drumstick and the thigh should break, the thigh bone can still be removed from the thigh meat. Therewith, the process becomes more robust.

In a possible embodiment, the transverse cut at the knee joint extends between the knee side end of the tibia bone and the knee side end of the thigh bone. In this embodiment, the tibia bone and the thigh bone are not damaged by the transverse cut at the knee joint. This reduces the risk of bone splinters being present in the thigh meat or in the drumstick.

In a possible embodiment, the transverse cut extends from the rear side of the leg product to a cut end which is located adjacent to the front of the leg product. In this embodiment, the front side of the leg product is defined as the side on which in an unprocessed poultry leg in which the knee joint comprises a knee cap, said knee cap is naturally located. The rear side is the side opposite to said front side.

In a variant of this embodiment, the knee joint of the leg product further comprises a knee cap, and the cut end of the transverse cut is located adjacent to the rear side of the knee cap. The knee cap remains intact or largely intact.

In a possible embodiment of the method according to the invention, the step of providing the defeathered whole leg poultry product comprises two stages. In this embodiment, first a defeathered whole leg poultry product is provided which comprises a thigh, a drumstick and a knee joint. In general, the leg part between the tarsal joint and the foot as well as the foot itself have already been removed. The thigh comprises at least a thigh bone and thigh meat. The thigh bone has a knee side end and a hip side end, and the thigh bone comprises a knee side condyle and optionally a hip side condyle. At these condyles, the thigh bone is thicker than between these condyles. The drumstick comprises at least a tibia bone and drumstick meat. The tibia bone has a knee side end and a tarsal joint side end. The knee joint comprises at least a connection between the thigh and the drumstick. Optionally, a knee cap is present. The defeathered whole leg poultry product has a front side, which is the side on which the knee cap is located, and a rear side, which is the side opposite to the front side.

In this embodiment, in the second stage of the step of providing the defeathered whole leg poultry product, the transverse cut at the knee joint is made by using a knee cutter. This transverse cut extends generally in a direction transverse to the thigh bone and the tibia bone, and from one side of the defeathered whole leg poultry product (e.g. from the rear side of the defeathered whole leg poultry product) to a cut end. This cut end is located adjacent to the opposite side of the defeathered whole leg poultry product so that the thigh and the drumstick are still connected to each other. By the transverse cut, a drumstick side cut plane and a thigh side cut plane are created. The drumstick side cut plane and the thigh side cut plane are connected to each other adjacent to the cut end.

In general, the thigh bone may still comprise a hip side condyle, or the hip side condyle may have been removed either intentionally or unintentionally. If the hip side condyle is still present, the diameter of the thigh bone at the hip side end will be larger than the diameter of the thigh bone between the knee side condyle and the hip side condyle, as the thigh bone is thicker at the condyles than between the condyles.

If no hip side condyle is present, this means that the hip side condyle has been removed from the thigh bone. This can be done intentionally, e.g. as a consequence of the chosen way to separate the defeathered whole leg poultry product from the rest of the poultry carcass, on unintentionally, e.g. by breaking it off during transport or storage. If no hip side condyle is present any more, the diameter of the thigh bone at the hip side end will be similar to the diameter of the thigh bone just behind the knee side condyle.

The "region of the thigh bone between the knee side condyle and the hip side condyle" is a part of the "region of the thigh bone between the knee side condyle and the hip side end" if a hip side condyle is present.

In a possible embodiment, a resilient scraper member comprising a central aperture is arranged adjacent to the thigh side cut plane of the transverse cut at the knee joint in the step of removing the thigh bone from the thigh meat via the thigh side cut plane of the transverse cut at the knee joint. The knee side condyle is in this embodiment forced through said central aperture by exerting a pushing force on the thigh bone, thereby severing thigh meat from the knee side condyle of the thigh bone. Optionally, the pushing force is exerted on the hip side end of the thigh bone.

Preferably, this central aperture has a diameter that is variable between a minimum diameter and a maximum diameter. The minimum diameter is smaller than the maximum diameter of a knee side condyle of the thigh bone, and the central aperture is biased towards its minimum diameter. This provides an effective arrangement for severing the thigh meat from the knee side condyle of the thigh bone.

The diameter of the central aperture is variable due to the resilience of the resilient scraper member. This can be achieved in several ways. For example, the resilient scraper member may be made of a resilient material. When a thigh bone is forced through the central aperture, the central aperture is stretched by the thigh bone. Thereby, the diameter of the central aperture increases. Alternatively, the resilient scraper member may comprise multiple scraper elements that are resiliently mounted and biased towards each other. They have such a shape, that they leave a central aperture between them when the resilient scraper member is not active. When a thigh bone is forced through the central aperture, the scraper elements move away from each other, thereby increasing the diameter of the central aperture.

Optionally, the minimum diameter of the central aperture is larger than the thickness of the thigh bone in the region between the knee side condyle and the hip side condyle or in the region between the knee side condyle and the hip side end if no hip side condyle is present any more. This reduces the change in diameter that the central aperture experiences during the severing of the meat from the bone, and therewith increases the life span of the resilient scraper member with the central aperture. In this variant of the embodiment, generally the thigh meat will be severed from the part of the thigh bone between the knee condyle and the hip side end or between the knee condyle and the hip side condyle if one is present by other means than the resilient scraper member with the central aperture.

Furthermore, in this embodiment, the thigh bone is subjected to compressive forces in its longitudinal direction when the thigh meat is severed from the knee side condyle of the thigh bone. This is advantageous, because in this stage of removing the thigh bone from the thigh meat, relatively high forces are required. The strength of the thigh bone in highest in the direction of compression in the longitudinal direction of the bone (e.g. compared to bending strength or tension strength), so in this embodiment the risk of breaking the thigh bone during its removal from the thigh meat is reduced.

The hip side end of the thigh bone is a convenient place to engage the thigh bone in order to exert the pushing force, as the hip side end of the thigh bone is often exposed or at least close to surface of the thigh.

Preferably, the thigh meat is severed from the knee side condyle before the thigh meat is severed from the other parts of the thigh bone.

Optionally, the thigh bone is positioned relative to the central aperture before the knee side condyle is forced though the central aperture, or during the initial phase of forcing the knee side condyle through the central aperture. This can be achieved for example by providing a pusher that engages the thigh at or near the hip side end of the thigh bone, which pusher comprises a recess with slanting walls in which the hip side end of the thigh bone is introduced.

In a possible embodiment, thigh meat is severed from the region of the thigh bone between the knee side condyle and the hip side end or between the knee side condyle and the hip side condyle by scraping during the step of removing the thigh bone from the thigh meat via the thigh side cut plane of the transverse cut at the knee joint using at least one scraper.

In this embodiment, said thigh meat is scraped from the region of the thigh bone between the knee side condyle and the hip side end or between the knee side condyle and the hip side condyle in the direction from the knee side end towards the hip side end. An advantage of this that any oyster meat which may be present can be harvested together with and interconnected with the thigh meat. The oyster is a tasty piece of meat of about 10 to 15 grams which is anatomically located in the hip region of poultry. It is connected to the thigh meat, but this connection is not so strong. On the other hand, the oyster and the hip side end of the thigh bone are connected to each other quite strongly.

If thigh meat is scraped from the thigh bone in the direction from the knee side end to the hip side end, the connection between the thigh meat and the oyster is not subjected to large forces, so it generally stays intact. After the scraping, the thigh meat is only connected to the thigh bone via some connections with the hip side end, and when these are cut through, the connection between the oyster and the thigh bone can be easily cut through as well.

A further advantage of scraping in this direction is that the scraping action is largely independent from the shape and/or condition of the thigh bone in the hip region. The scraping is for example not disturbed by a missing hip side condyle. In general, the knee side end of the thigh bone tends to be less damaged by previous processing of the defeathered whole leg poultry product than the hip side end. The hip side end can be damaged in a prior process, e.g. leading to the loss of the hip side condyle, e.g. when the leg was disconnected from the poultry body or during storage or transport of the defeathered whole leg poultry product. As the transverse cut at the knee joint is generally made shortly before removal of the thigh bone, there is usually less damage to the knee side end of the thigh bone.

In a variant to this embodiment, during the scraping, the thigh bone is moved relative to said scraper by exerting a pulling force on the thigh bone by a puller. Optionally a puller is used that engages the thigh bone just behind the knee side condyle. Preferably, such a puller does not or hardly exerts a squeezing force onto the thigh bone part behind the knee side condyle.

Preferably, the thigh meat is severed from the region of the thigh bone between the knee side condyle and the hip side end or the hip side condyle after the thigh meat is severed from the knee side condyle. Because the thigh bone is removed via the thigh side cut plane, this is the most practical sequence. Furthermore, by clearing the knee side condyle from thigh meat, the knee side condyle comes available as an area of engagement for a puller. The area of the thigh bone at or adjacent to the knee side condyle offers a suitable place for the puller to engage the thigh bone. This area is quite strong and the knee side condyle, which is thicker than the thigh bone in the region between the knee side condyle and the hip side end or hip side condyle offers good grip for the puller.

In a possible embodiment, a resilient scraper member comprising a central aperture is also used for severing thigh meat from the hip side condyle of the thigh bone, in case such a hip side condyle is still present. In this embodiment, the resilient scraper member having the central aperture is arranged adjacent to the thigh side cut plane of the transverse cut at the knee joint in the step of removing thigh bone from the thigh meat via the thigh side cut plane of the transverse cut at the knee joint. In this embodiment, the hip side condyle is forced through said central aperture by exerting a pulling force on the thigh bone, thereby severing thigh meat from the hip side condyle of the thigh bone. Optionally a puller is used that engages the thigh bone just behind the knee side condyle.

Preferably, this central aperture has a diameter that is variable between a minimum diameter and a maximum diameter, due to the resilience of the resilient scraper member. The minimum diameter is smaller than the maximum diameter of a hip side condyle of the thigh bone, and the central aperture is biased towards its minimum diameter. This provides an effective arrangement for severing thigh meat from the hip side condyle of the thigh bone. Furthermore, it reduces the change in diameter that the central aperture experiences during the severing of the meat from the bone, and therewith increases the life span of the resilient scraper member with the central aperture. In this variant of the embodiment, generally the thigh meat will be severed from the part of the thigh bone between the knee condyle and the hip side condyle if one is present by other means than the resilient scraper member with the central aperture.

In a variant of this embodiment, the resilient scraper member with the central aperture that severs thigh meat from the hip side condyle can be the same as the resilient scraper member with the central aperture that is used to sever thigh meat from the knee side condyle of the thigh bone.

In a possible embodiment, the thigh bone is removed from the thigh meat via the thigh side cut plane of the transverse cut at the knee joint by severing the thigh meat and the thigh bone from each other by a combination of scraping and cutting. Optionally, first the scraping takes place and then the final severing of the thigh meat and the thigh bone takes place by cutting. Preferably, the scraping takes place in a direction from the knee side end to the thigh side end of the thigh bone, and the cutting separated a connection between the thigh meat and the hip side end of the thigh bone. As described above, this allows to harvest the oyster in such a away that after the harvesting it is still connected to the thigh meat.

In a possible embodiment, the step of removing the thigh bone from the thigh meat via the thigh side cut plane of the transverse cut at the knee joint comprises:

arranging a resilient scraper member comprising a central aperture adjacent to the thigh side cut plane of the transverse cut at the knee joint, forcing the knee side condyle through said central aperture by exerting a pushing force on the thigh bone, optionally on the hip side end of the thigh bone, thereby severing thigh meat from the knee side condyle of the thigh bone, engaging the thigh bone just behind the knee side condyle with a puller, while exerting a pulling force on the thigh bone by the puller, scraping the thigh meat from a region of the thigh bone between the knee side condyle and the hip side end using a scraper, wherein the thigh meat is scraped from the thigh bone in a scraping direction from the knee side end towards the hip side end of the thigh bone, cutting through any remaining tissue connections between the hip side end of the thigh bone and the thigh meat.

This embodiment has shown to be effective in removing the thigh bone from the thigh meat without breaking or otherwise damaging the thigh bone.

An advantage of scraping in the direction from the knee side end towards the thigh side end is that any oyster meat which may be present can be harvested together with and interconnected with the thigh meat. The oyster is a tasty piece of meat of about 10 to 15 grams which is present in the hip region of poultry. It is connected to the thigh meat, but this connection is not so strong. On the other hand, the oyster and the hip side end of the thigh bone are connected to each other quite strongly.

If thigh meat is scraped from the thigh bone in the direction from the knee side end to the hip side end, the connection between the thigh meat and the oyster is not subjected to large forces, so it generally stays intact. After the scraping, the thigh meat is only connected to the thigh bone via some connections with the hip side end, and when these are cut through, the connection between the oyster and the thigh bone can be easily cut through as well.

A further advantage of scraping in this direction is that the scraping action is largely independent from the shape and/or condition of the thigh bone in the hip region. The scraping is for example not disturbed by a missing hip side condyle. In general, the knee side end of the thigh bone tends to be less damaged by previous processing of the leg product than the hip side end. The hip side end can be damaged in a prior process, e.g. leading to the loss of the hip side condyle, e.g. when the leg was disconnected from the poultry body or during storage or transport of the leg product. As the transverse cut at the knee joint is generally made shortly before removal of the thigh bone, there is usually less damage to the knee side end of the thigh bone.

In the embodiment, preferably, the central aperture has a diameter that is variable between a minimum diameter and a maximum diameter, due to the resilience of the resilient scraper member. The minimum diameter is smaller than the maximum diameter of a knee side condyle of the thigh bone, and the central aperture is biased towards its minimum diameter. This provides an effective arrangement for severing the thigh meat from the knee side condyle and the thigh side condyle of the thigh bone.

Optionally, the minimum diameter of the central aperture is larger than the thickness of the thigh bone in the region between the knee side condyle and the hip side condyle or in the region between the knee side condyle and the hip side end if no hip side condyle is present. By keeping the minimum diameter of the central aperture larger than the thickness of the thigh bone in the region between the knee side condyle and the hip side end or hip side condyle, the difference between the minimum diameter of the central aperture and the diameter of the central aperture that is necessary to pass the knee side condyle and the hip side condyle through the central aperture is smaller than when the minimum diameter of the central aperture would not be larger than the thickness of the thigh bone in the region between the knee side condyle and the hip side condyle or hip side end. This makes that less force is exerted on the thigh bone during the severing of thigh meat from the knee side condyle and from the thigh side condyle and that the mechanical loads on the resilient scraper member with the central aperture itself are reduced as well. This reduces the risk of breaking the thigh bone and increases the life span of the resilient scraper member with the central aperture.

In a variant of this embodiment, when a leg product is processed of which the thigh bone further comprises a hip side condyle at the hip side end, the thigh meat is scraped from a region of the thigh bone between the knee side condyle and the hip side condyle. In this variant, the method further comprises the step of: after the scraping of the meat from the region of the thigh bone between the knee side condyle and the hip side condyle, forcing the hip side condyle through said central aperture by exerting a pulling force on the thigh bone, using the puller that engages the thigh bone just behind the knee side condyle, thereby severing thigh meat from the hip side condyle of the thigh bone. Optionally, the scraper is moved to an inactive state, away from the thigh bone, before the hip side condyle is forced through the central aperture.

In a variant of this embodiment, in case a leg product is processed that comprise a hip side condyle, the scraper moves when the hip side condyle passes the scraper to accommodate the increased diameter of the thigh bone at the hip side condyle. In general therefore, the scraper will move outwardly a bit. This prevents undue scraping forces to be exerted on the hip side condyle.

In a further variant of this embodiment, the puller moves the thigh bone back towards the resilient scraper member and the scraper again after the hip side end of the thigh bone has passed through the scraper, to a position in which the hip side end rests on the scraper. Then, the connection between in the thigh meat and the thigh bone at the hip side end of the thigh bone is cut through. This allows to obtain an optimal yield. Optionally, the connection between in the thigh meat and the thigh bone at the hip side end of the thigh bone is cut through by a sharp edge on the scraper. Alternatively, a separate cutter is provided that cuts directly adjacent to the scraper.

In a variant of any embodiment that comprises a scraper for scraping thigh meat from the thigh bone in a region between the knee side condyle and/or a region between the knee side condyle and the hip side end of the thigh bone, and in particular of the embodiment discussed above, regardless of the size of the minimum diameter of the central aperture, the scraper that scrapes the thigh meat from the region of the thigh bone between the knee side condyle and the hip side condyle is activated by the knee side condyle.

The scraper that scrapes the thigh meat from the region of the thigh bone between the knee side condyle and the hip side condyle has to become active at some point in time. In the embodiment in which the resilient scraper member with the central aperture severs thigh meat from the knee side condyle, this has to happen once the thigh meat is severed from the knee condyle by the resilient scraper member with the central aperture. The scraper that subsequently scrapes the thigh meat from the region of the thigh bone between the knee side condyle and the hip side condyle can become active after the thigh bone protrudes through the central aperture over a certain length. Once the relevant protrusion length is obtained, this can be detected, for example in a mechanical, electronic or optical way, which detection triggers the activation of the scraper.

In a possible embodiment, a poultry products conveyor is provided. This poultry products conveyor comprises a track and a plurality of poultry product carriers. The poultry product carriers are spaced apart from one another in the direction of the track and are movable along said track. Each poultry product carrier is adapted to hold at least one defeathered whole leg poultry product at the tarsal joint side end thereof such that the leg product is conveyed hanging from said carrier. In this embodiment, the leg product is arranged in a poultry product carrier of the poultry products conveyor before the step of changing the angle between the thigh and the drumstick is carried out. For example, a product carrier as shown in WO93/13671 can be used.

In a possible embodiment, the method according to the invention further comprises the step of arranging the leg product in a poultry product carrier of such a poultry products conveyor system. The leg product is suspended from said poultry product carrier. In this embodiment, at least the steps of changing the angle between the thigh and the drumstick by bending the leg product at the knee joint and thereby opening the transverse cut at the knee joint and exposing the thigh side cut plane and of removing the thigh bone from the thigh meat via the thigh side cut plane of the transverse cut at the knee joint are carried out while the leg product is suspended from said poultry product carrier. It is possible that these method steps are carried out while the leg product is suspended from the same poultry product carrier. In this embodiment, the method according to the invention can be carried out in line, in an automated production process. Optionally, the method according to the invention is part of an automated cut up process for poultry product carcasses or poultry product carcass parts (e.g. back halves). Optionally, a plurality of or even all steps in this automated cut up process are carried out while the poultry carcass or carcass part is in the same poultry product carrier.

In a possible embodiment, the method according to the invention is carried out in a carrousel machine. The carrousel machine can comprise one or more processing devices that move along with a defeathered whole leg poultry product that undergoes the method according to the invention. In a carrousel machine, the processing devices are mounted to be movable along a circular or other loop-shaped path, e.g. an elliptical path or a path made up out of a combination of straight lines and curves.

In a possible embodiment, the method further comprises the step of severing the thigh meat (from which the thigh bone has been removed) from the drumstick.

The invention further pertains to a system for removing a thigh bone from a defeathered whole leg poultry product, which defeathered whole leg poultry product comprises:
  a thigh, which thigh comprises at least a thigh bone and thigh meat, wherein the thigh bone has a knee side end and a hip side end, and wherein the thigh bone comprises a knee side condyle,
  a drumstick, which drumstick comprises at least a tibia bone and drumstick meat, wherein the tibia bone has a knee side end and a tarsal joint side end,
  a knee joint, which knee joint comprises at least a connection between the thigh and the drumstick,
  in which defeathered whole leg poultry product, a transverse cut has been provided at the knee joint that extends generally in a direction transverse to the thigh bone and the tibia bone, which transverse cut extends from one side of the defeathered whole leg poultry product to a cut end which is located adjacent to the opposite side of the defeathered whole leg poultry product so that the thigh and the drumstick are connected to each other, by which transverse cut a drumstick side cut plane and a thigh side cut plane are created, wherein the system comprises:

a poultry products conveyor, comprising:

a track, a plurality of poultry product carriers which are spaced apart from one another in the direction of the track and which are movable along said track, wherein each poultry product carrier is adapted to hold at least one defeathered whole leg poultry product at the tarsal joint side end thereof such that the defeathered whole leg poultry product is conveyed hanging from said carrier, a thigh bone remover device, which is arranged along the track of the poultry products conveyor, comprising:

a bender device which is adapted to engage the defeathered whole leg poultry product and bend it at the knee joint to a bent position, during which bending the thigh meat remains on the thigh bone and the drumstick meat remains on the tibia bone, by said bending changing the angle between the thigh and the drumstick, opening the transverse cut at the knee joint and exposing the thigh side cut plane while keeping the thigh and the drumstick connected to each other, which bender device is further adapted to keep the defeathered whole leg poultry product in the bent position, a thigh bone remover assembly which is adapted to removing the thigh bone from the thigh meat via the thigh side cut plane of the transverse cut at the knee joint while the thigh meat and the drumstick are kept connected to each other and while the transverse cut at the knee joint is kept open by the bender device.

With this system according to the invention, the method according to the invention can be carried out.

The input product to be processed by the system according to the invention is the same type of defeathered whole leg poultry product ("leg product") as is provided in the first step of the method according to the invention or in any of the embodiments thereof.

The system according to the invention comprises a poultry products conveyor. This poultry products conveyor comprises a track and a plurality of poultry product carriers. The poultry product carriers are spaced apart from one another in the direction of the track and are movable along said track. Each poultry product carrier is adapted to hold at least one defeathered whole leg poultry product at the tarsal joint side end thereof such that the leg product is conveyed hanging from said carrier.

The system according to the invention further comprises a thigh bone remover device, which is arranged along the track of the poultry products conveyor. The thigh bone remover device comprises a bender device and a thigh bone displacement assembly.

The bender device is adapted to engage the leg product and bend it at the knee joint into a bent position. By this bending, the angle between the thigh and the drumstick is changed and the transverse cut at the knee joint is opened. This results in exposing the thigh side cut plane. During this bending, the thigh and the drumstick remain connected to each other and the thigh meat remains on the thigh bone and the drumstick meat remains on the tibia bone. The bender device is further adapted to keep the leg product in the bent position.

The thigh bone remover assembly is adapted to remove the thigh bone from the thigh meat via the thigh side cut plane of the transverse cut at the knee joint while the thigh and the drumstick are kept connected to each other and while the transverse cut at the knee joint is kept open by the bender device.

By removing the thigh bone via the thigh side cut plane, it is no longer necessary to make a longitudinal cut in the thigh meat along the thigh bone.

Furthermore, by removing the thigh bone via the thigh side cut plane, the connection between the drumstick and the thigh is not or hardly subjected to pulling forces that originate from the removal of the thigh bone from the thigh meat. Therefore, the chance that this connection breaks is reduced. Furthermore, even if the connection between the drumstick and the thigh should break, the thigh bone can still be removed from the thigh meat. Therewith, the process becomes more robust.

In a possible embodiment, the thigh bone remover assembly comprises a resilient scraper member having a central aperture and a thigh bone displacement assembly.

The resilient scraper member with a central aperture is arrangeable adjacent to the thigh side cut plane of the transverse cut at the knee joint. The central aperture has a diameter that is variable between a minimum diameter and a maximum diameter due to the resilience of the resilient scraper. The minimum diameter is smaller than the maximum diameter of a knee side condyle of the thigh bone. The central aperture is biased towards its minimum diameter.

The thigh bone displacement assembly is adapted to force the thigh bone through the central aperture while the transverse cut at the knee joint is kept open and the thigh and the drumstick are kept connected to each other. By moving the thigh bone through the central aperture thigh meat is severed from the thigh bone.

This embodiment can be adapted to sever thigh meat from the entire thigh bone or just from a part thereof, e.g. just from the knee side condyle and/or the hip side condyle (if a hip side condyle is present). If it is desired the that thigh meat is severed from the entire thigh bone, the minimum diameter of the central aperture is selected to be smaller than the thickness of the thigh bone in the region between the knee side condyle and the hip side condyle or in the region between the knee side condyle and the hip side end if no hip side condyle is present.

If it is desired that the resilient scraper member with a central aperture should only sever thigh meat from the knee side condyle and optionally from the hip side condyle, the minimum diameter of the central aperture is advantageously selected to be larger than the thickness of the thigh bone in the region between the knee side condyle and the hip side condyle or—if no hip side condyle is present—in the region between the knee side condyle and the hip side end. If no hip side condyle is present any more, the diameter of the thigh bone at hip side end will generally be similar to the diameter of the thigh bone just behind the knee side condyle. In the variant in which the minimum diameter of the central aperture is larger than the diameter of the thigh bone between the knee side condyle and the hip side condyle or hip side end, the thigh meat can be severed from the part of the thigh bone between the knee side condyle and the hip side condyle in a different way and/or by different means, e.g. by scraping using a scraper. If no hip side condyle is present any more at the thigh bone, the diameter of the thigh bone at hip side end will generally be similar to the diameter of the thigh bone just behind the knee side condyle.

In a possible embodiment, the thigh bone displacement assembly comprises a pusher, which is adapted to exert a pushing force on the thigh bone to force the knee side condyle of the thigh bone through the central aperture. The pusher can for example comprise a moveable pusher block which is optionally provided with a recess preferably a recess with slanting walls, e.g. a generally half-spherical or conical recess. As the thigh bone will provide the strongest resistance when the moveable pusher block forces the thigh against the resilient scraper member with the central aperture, the hip side end of the thigh bone will assume a position in which said hip side end is located in the deepest part of the recess that it can get into. When the moveable pusher block is arranged with the deepest part of the recess in line with the center of the central aperture as seen in the direction in which the moveable pusher block is moveable, the thigh bone will be pushed through the central aperture in a straight line without resulting transverse forces being exerted on the thigh bone. This further reduces the risk of breaking the thigh bone.

In a possible embodiment, the resilient scraper member is provided with a recess with slanting walls, e.g. a generally half-spherical or conical recess, wherein the central aperture is arranged at the deepest part of said recess. As the thigh bone will provide the strongest resistance when the thigh is forced against the resilient scraper member with the central aperture, the knee side end of the thigh bone will assume a position in which said knee side end is located in the central aperture. The slanting walls guide the knee side end of the thighbone gradually towards and into the central aperture, even when of the thigh bone is initially not entirely aligned with the central aperture. This further reduces the risk of breaking the thigh bone.

In a possible embodiment, the thigh bone remover assembly comprises or further comprises a scraper and a puller.

The scraper is adapted to scrape the thigh meat from the thigh bone in a region between the knee side condyle and the hip side condyle of between the knee side condyle and the hips side end if no hip side condyle is present any more, in the direction from the knee side end towards the hip side end. The puller is adapted to exert a pulling force on the thigh bone in order to move the thigh bone relative to the scraper. As explained before, this helps to harvest the oyster meat while keeping it interconnected with the thigh meat, and makes the scraping process more robust as the scraping starts from the generally undamaged knee side end of the thigh bone.

Optionally, the puller is adapted to engage the thigh bone at or adjacent to the knee side condyle, preferably after the knee side condyle has been moved through the central aperture. To this end, the puller optionally comprises a moveable puller plate which has a slot, e.g. a V-shaped slot, that has such a shape and size that it can grab the thigh bone by or adjacent to the knee side condyle. In an alternative embodiment, the puller may comprise two jaws that are adapted to clamp the thigh bone between them.

The scraper optionally comprises two scraper elements between which the thigh bone is to be arranged. The scraper elements are preferably moveable relative to each other and biased towards the thigh bone.

Optionally, the puller is adapted to pull the hip side condyle of the thigh bone through the central aperture in case such a hip side condyle is present. In this embodiment, the puller is able to exert enough force to pull the hip side condyle through the central aperture and the stroke over which the puller is moveable is long enough to pull the hip side condyle through the central aperture. Optionally, the scraper is transferred into an inactive state before the hip side condyle is pulled though the central aperture.

Optionally, the thigh bone remover assembly comprises a scraper activator. For example, the scraper can have an active state and an inactive state. The scraper can be in an inactive state while the knee side condyle is being forced through the central aperture. In the inactive state, the scraper, in particular any scraper elements if such are present, do not engage the thigh bone. Once the knee side condyle of the thigh bone has passed through the central aperture, the scraper can be brought into the active state. In the active state, the scraper, in particular any scraper elements if such are present, engage the thigh bone or tissues on the thigh bone. The thigh bone displacement assembly then moves the thigh bone relative to the scraper so that the thigh meat is severed from the thigh bone, at least in the region of the thigh bone between the knee side condyle and the hip side condyle. The scraper activator induces the transition from the inactive state to the active state.

In a possible variant of this embodiment the scraper comprises at least one scraper element that is biased towards the thigh bone. In the inactive state, the scraper element is in a position away from the thigh bone. The scraper element is locked in this inactive state by a locking device, e.g, by a locking pin or latch. Once the knee side condyle has passed through the central aperture, the scraper activator is triggered and actuates the locking device, thereby releasing the scraper element. Due to the biasing of the scraper element, the scraper element then moves into an active state, in which it engages the thigh bone or tissue on the thigh bone (e.g. a pellicle or membrane on the thigh bone).

The triggering of the scraper activator can take place in many different ways. For example, the triggering can be caused by the thigh bone that protrudes from the central aperture. Once the thigh bone protrudes from the central aperture over a certain predetermined length, the triggering is activated. The triggering can for example occur by a mechanical, electrical or optical sensor that detects that the predetermined length of protrusion of the thigh bone through the central aperture has occurred. In a possible variant, the knee side condyle of the thigh bone engages a moveable trigger block when the predetermined length of protrusion of the thigh bone through the central aperture has occurred. The moveable trigger block is connected to a locking pin that locks the scraper element or scraper elements in the inactive state. Moving the thigh bone further through the central aperture makes that the movable trigger block moves along with the thigh bone. The locking pin moves along with the moveable trigger block, and therewith releases the scraper element or scraper elements so that the scraper element or scraper elements come into the active state.

In a possible embodiment, the scraper is moved back into an inactive state before the hip side end or the hip side condyle passes through the central aperture.

In a possible embodiment, the system according to the invention comprises a finisher cutter, which finisher cutter is adapted to sever a tissue connection between the thigh meat and the thigh bone after the scraping of the thigh meat from the thigh bone.

In a possible embodiment, the scraper assumes a shielding state between the thigh bone and the thigh meat when the hip side condyle has passed through the central aperture. In the shielding state, the thigh bone is present on one side of a scraper element and at least the majority of the severed thigh meat is present on the opposite side of the scrape element. This allows the thigh bone to be cut loose from the thigh meat while shielding the thigh meat from undesired damage by the finishing cutter that is used to cut the thigh bone loose from the thigh bone.

In a possible variant of those embodiments in which a resilient scraper member with a central aperture and a scraper are provided, the scraper is arranged on the side of the central aperture opposite to the side on which the thigh side cut plane of the leg product is arranged. This way, the resilient scraper member with the central aperture can shield the thigh meat that is already severed from the thigh bone from getting caught in the scraper.

In a possible embodiment of the system according to the invention, the poultry product carrier comprises a pivot that allows to pivot the leg product about a horizontal pivot axis when bending the leg product. This makes it possible to select the direction in which the thigh bone is moved during the removal of the thigh bone via the thigh side cut plane. For example, it can be desired that this movement takes place in a substantially vertical direction, e.g. when multiple thigh bone remover assemblies or thigh bone remover devices are to be arranged in a carrousel machine.

In a possible embodiment, the system further comprises a thigh meat harvester device, which is arranged along the track of the poultry products conveyor downstream of the thigh bone remover device. The thigh meat harvester device comprises a cutter which is adapted to sever the thigh meat (from which the thigh bone has been removed) from the drumstick.

In a possible embodiment the system further comprises a knee meat and thigh meat harvester device. The knee meat and thigh meat harvester device is arranged along the track of the poultry products conveyor downstream of the a thigh bone remover device. The knee meat and thigh meat harvester device comprises a cutter which is adapted to sever the thigh meat (from which the thigh bone has been removed) together with the knee meat from the drumstick. Preferably, the thigh meat and the knee meat are still interconnected after severing it from the drumstick.

In a possible embodiment, the bender device is adapted to rotate the drumstick relative to the thigh about the connection at the knee joint to a bent position in which the smallest angle between the thigh and the drumstick is on the front side of the leg product. The front side is the side on which in an unprocessed poultry leg in which the knee joint comprises a knee cap, said knee cap is naturally located. The rear side is the side opposite to the front side. So, the bending occurs is a direction that is opposite to the natural bending direction of the knee joint. Generally, in this embodiment, a leg product is processed in which the transverse cut extends from the rear side of the leg product to a cut end which is located adjacent to the front of the leg product. Optionally, the cut end is located adjacent to the rear of the knee cap.

In a possible embodiment, at least one thigh bone remover device is arranged in a carrousel machine. In the carrousel machine, the one or more processing devices move along with a leg product that undergoes the method according to the invention. In a carrousel machine, the processing devices are mounted to be movable along a circular or other loop-shaped path, e.g. an elliptical path or a path made up out of a combination of straight lines and curves.

The invention further pertains to a method and a system for removing a thigh bone from a poultry thigh, which poultry thigh has already been separated from the drumstick of a defeathered whole leg poultry product.

According to this aspect of the invention, the method for removing a thigh bone from a poultry thigh comprises the following steps:
  providing a poultry thigh, which poultry thigh comprises at least a thigh bone and thigh meat and a thigh side cut plane, wherein the thigh bone has a knee side end and a hip side end, and wherein the thigh bone comprises a knee side condyle,
  arranging a resilient scraper member comprising a central aperture adjacent to the thigh side cut plane of the poultry thigh,
  forcing the knee side condyle through said central aperture by exerting a pushing force on the thigh bone, optionally on the hip side end of the thigh bone, thereby severing thigh meat from the knee side condyle of the thigh bone,
  engaging the thigh bone just behind the knee side condyle with a puller,
  while exerting a pulling force on the thigh bone by the puller, scraping the thigh meat from a region of the thigh bone between the knee side condyle and the hip side end in the direction from the knee side condyle towards the hip side end, using a scraper,
  cutting through any remaining tissue connections between the hip side end of the thigh bone and the thigh meat.

Optionally, the thigh bone further comprises a hip side condyle at the hip side end and the thigh meat is scraped from a region of the thigh bone between the knee side condyle and the hip side condyle. In this embodiment, the method further comprises the step of after the scraping of the meat from the region of the thigh bone between the knee side condyle and the hip side condyle, forcing the hip side condyle said central aperture by exerting a pulling force on the thigh bone, using the puller that engages the thigh bone just behind the knee side condyle, thereby severing thigh meat from the hip side condyle of the thigh bone.

Optionally, the scraper that scrapes the thigh meat from the region of the thigh bone between the knee side condyle and the hip side end or hip side condyle is activated by the knee side condyle.

According to this aspect of the invention, a system is provided for removing a thigh bone from a poultry thigh, which poultry thigh comprises at least a thigh bone and thigh meat and a thigh side cut plane, wherein the thigh bone has a knee side end and a hip side end, and wherein the thigh bone comprises a knee side condyle and optionally a hip side condyle, comprises:
  a resilient scraper member having a central aperture, which resilient scraper member is arrangeable adjacent to the thigh side cut plane, which central aperture has a diameter that is variable between a minimum diameter and a maximum diameter, wherein the minimum diameter is smaller than the maximum diameter of a knee side condyle of the thigh bone, and wherein the central aperture is biased towards its minimum diameter, and the minimum diameter of the central aperture is larger than the thickness of the thigh bone in the region between the knee side condyle and the hip side condyle, or if no hip side condyle is present, between the knee side condyle and the hip side end,
  a thigh bone displacement assembly that is adapted to force the thigh bone through the central aperture, thereby severing thigh meat from the thigh bone, which thigh bone displacement assembly comprises a pusher, which is adapted to exert a pushing force on the thigh bone to force the knee side condyle of the thigh bone through the central aperture,
  a scraper which is adapted to scrape the thigh meat from the thigh bone between the knee side condyle and the hip side condyle or if no hip side condyle is present, between the knee side condyle and the hip side end, in the direction from the knee side condyle towards the hip side end, a puller which is adapted to exert a pulling force on the thigh bone in order to move the thigh bone relative to the scraper and wherein said puller is adapted to pull the hip side condyle of the thigh bone through the central aperture.

In this system, the resilient scraper member with a central aperture is designed to only sever thigh meat from the knee side condyle and—if a hip side condyle is present—the hip side condyle. Therefore, the minimum diameter of the central aperture is selected to be larger than the thickness of the thigh bone in the region between the knee side condyle and the hip side condyle or—if no hip side condyle is present—in the region between the knee side condyle and the hip side end. If no hip side condyle is present any more, the diameter of the thigh bone at hip side end will generally be similar to the diameter of the thigh bone just behind the knee side condyle. The thigh meat is severed from the part of the thigh bone between the knee side condyle and the hip side condyle—or if no hip side condyle is present: the hip side end—by scraping using a scraper.

An advantage of scraping in the direction from the knee side end towards the thigh side end is that any oyster meat which may be present can be harvested together with and interconnected with the thigh meat. The oyster is a tasty piece of meat of about 10 to 15 grams which is present in the hip region of poultry. It is connected to the thigh meat, but this connection is not so strong. On the other hand, the oyster and the hip side end of the thigh bone are connected to each other quite strongly.

If thigh meat is scraped from the thigh bone in the direction from the knee side end to the hip side end, the connection between the thigh meat and the oyster is not subjected to large forces, so it generally stays intact. After the scraping, the thigh meat is only connected to the thigh bone via some connections with the hip side end, and when these are cut through, the connection between the oyster and the thigh bone can be easily cut through as well.

Optionally, this system comprises a scraper activator, which scraper activator is operated by the knee side condyle of the thigh bone.

The diameter of the central aperture is variable due to the resilience of the resilient scraper member. This can be achieved in several ways. For example, the resilient scraper member may be made of a resilient material. When a thigh bone is forced through the central aperture, the central aperture is stretched by the thigh bone. Thereby, the diameter of the central aperture increases. Alternatively, the resilient scraper member may comprise multiple scraper elements that are resiliently mounted and biased towards each other. They have such a shape, that they leave a central aperture between them when the resilient scraper member is not active. When a thigh bone is forced through the central aperture, the scraper elements move away from each other, thereby increasing the diameter of the central aperture.

In a possible embodiment, the pusher can for example comprise a moveable pusher block which is optionally provided with a recess preferably a recess with slanting walls, e.g. a generally half-spherical or conical recess. As the thigh bone will provide the strongest resistance when the moveable pusher block forces the thigh against the resilient scraper member with the central aperture, the hip side end of the thigh bone will assume a position in which said hip side end is located in the deepest part of the recess that it can get into. When the moveable pusher block is arranged with the deepest part of the recess in line with the center of the central aperture as seen in the direction in which the moveable pusher block is moveable, the thigh bone will be pushed through the central aperture in a straight line without resulting transverse forces being exerted on the thigh bone. This further reduces the risk of breaking the thigh bone.

In a possible embodiment, the resilient scraper member is provided with a recess with slanting walls, e.g. a generally half-spherical or conical recess, wherein the central aperture is arranged at the deepest part of said recess. As the thigh bone will provide the strongest resistance when the thigh is forced against the resilient scraper member with the central aperture, the knee side end of the thigh bone will assume a position in which said knee side end is located in the central aperture. The slanting walls guide the knee side end of the thighbone gradually towards and into the central aperture, even when of the thigh bone is initially not entirely aligned with the central aperture. This further reduces the risk of breaking the thigh bone.

In a possible embodiment, the scraper can have an active state and an inactive state. The scraper can be in an inactive state while the knee side condyle is being forced through the central aperture. In the inactive state, the scraper, in particular the scraper elements if such are present, do not engage the thigh bone. Once the knee side condyle of the thigh bone has passed through the central aperture, the scraper can be brought in the active state. In the active state, the scraper, in particular the scraper elements if such are present, engage the thigh bone or tissues on the thigh bone. The thigh bone displacement assembly then moves the thigh bone relative to the scraper so that the thigh meat is severed from the thigh bone, at least in the region of the thigh bone between the knee side condyle and the hip side condyle. The scraper activator induces the transition from the inactive state to the active state.

In a possible variant of this embodiment the scraper comprises at least one scraper element that is biased towards the thigh bone. In the inactive state, the scraper element is in an inactive state away from the thigh bone. The scraper element is locked in this inactive state by a locking device, e.g, by a locking pin or latch. Once the knee side condyle has passed through the central aperture, the scraper activator is triggered and actuates the locking device, thereby releasing the scraper element. Due to the biasing of the scraper element, the scraper element then moves into an active state in which it engages the thigh bone or tissue on the thigh bone (e.g. a pellicle or membrane on the thigh bone).

The triggering of the scraper activator can take place in many different ways. For example, the triggering can be caused by the thigh bone that protrudes from the central aperture. Once the thigh bone protrudes from the central aperture over a certain predetermined length, the triggering is activated. The triggering can for example occur by a mechanical, electrical or optical sensor that detects that the predetermined length of protrusion of the thigh bone through the central aperture has occurred. In a possible variant, the knee side condyle of the thigh bone engages a moveable trigger block when the predetermined length of protrusion of the thigh bone through the central aperture has occurred. The moveable trigger block is connected to a locking pin that locks the scraper element or scraper elements in the inactive state. Moving the thigh bone further through the central aperture makes that the movable trigger block moves along with the thigh bone. The locking pin moves along with the moveable trigger block, and therewith releases the scraper element or scraper elements so that the scraper element or scraper elements come into the active state.

In a possible embodiment, the system according to the invention comprises a finisher cutter, which finisher cutter is adapted to sever a tissue connection between the thigh meat and the thigh bone after the scraping of the thigh meat from the thigh bone.

In a possible embodiment, if a hip side condyle is present, the scraper is moved back into an inactive state before the hip side condyle passes through the central aperture.

In a possible embodiment, the scraper assumes a shielding state between the thigh bone and the thigh meat when the hip side condyle or hip side end has passed through the central aperture. In the shielding state, the thigh bone is present on one side of a scraper element and at least the majority of the severed thigh meat is present on the opposite side of the scrape element. This allows the thigh bone to be cut loose from the thigh meat while shielding the thigh meat from undesired damage by the finishing cutter that is used to cut the thigh bone loose from the thigh bone.

BRIEF DESCRIPTION OF THE DRAWINGS

The invention will be described in more detail below under reference to the drawing, in which in a non-limiting manner exemplary embodiments of the invention will be shown.

In the drawings.

DETAILED DESCRIPTION OF THE PREFERRED EMBODIMENTS

FIG. 1-13 serve to illustrate subsequent stages of an exemplary embodiment of the method according to the invention which is carried out in an embodiment of a system according to the invention.

Figure 1:
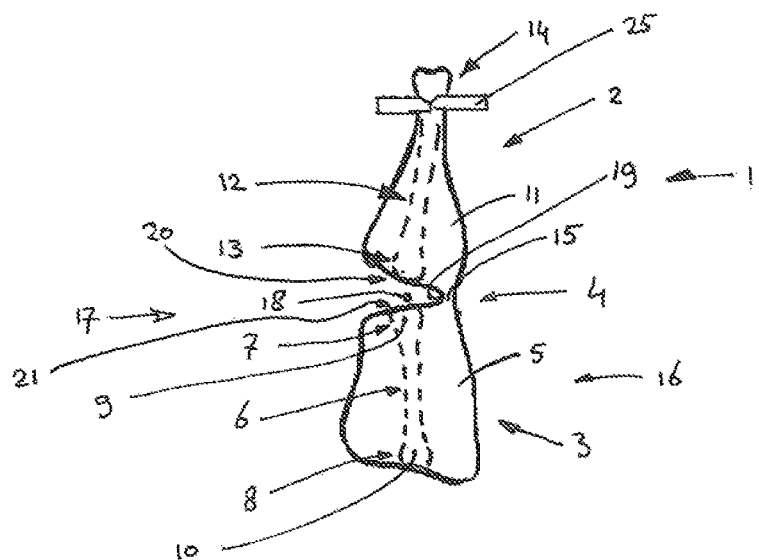
FIG. 1-13: illustrate subsequent stages of an exemplary embodiment of the method according to the invention which is carried out in an embodiment of a system according to the invention.

FIG. 1 shows a defeathered whole leg poultry product 1 ("leg product 1") as it is provided in the first step of the exemplary embodiment of the method according to the invention that is shown in FIG. 1-13. This leg product comprises a thigh 3, a drumstick 2 and a knee joint 4.

The thigh 3 comprises thigh meat 5 and a thigh bone 6. The thigh bone has a knee side end 7 and a hip side end 8. The thigh bone comprises a knee side condyle 9, which is the thicker bone part at the knee side end 7. In the embodiment of FIG. 1-13, the thigh bone 6 also comprises a hip side condyle 10, which is the thicker bone part at the hip side end 8 of the thigh bone 6.

The drumstick 2 comprises drumstick meat 11 and a tibia bone 12. The tibia bone 12 has a knee side end 13 and a tarsal joint side end 14.

The knee joint 4 comprises a connection 15 between the thigh 3 and the drumstick 2. Optionally, the knee joint 4 further comprises a knee cap (not shown in FIG. 1).

The leg product has a front side 16 and a rear side 17. The front side 16 is the side on which in an unprocessed poultry leg in which the knee joint comprises a knee cap, said knee cap is naturally located. The rear side 17 is the side opposite to the front side 16.

In the leg product, a transverse cut 18 has been provided at the knee joint 4. The transverse cut 18 extends generally in a direction transverse to the thigh bone 6 and the tibia bone 12. As can be seen in FIG. 1, the transverse cut 18 extends from one side of the leg product 1 to a cut end 19 which is located adjacent to the opposite side of the leg product 1 so that the thigh 3 and the drumstick 2 remain connected to each other. By the transverse cut 18, a drumstick side cut plane 20 and a thigh side cut plane 21 are created. They are connected to each other adjacent to the cut end 19.

In the embodiment shown in FIG. 1-13, the transverse cut 18 extends from the rear side 17 of the leg product 1 to a cut end 19 which is located adjacent to the front side 16 of the leg product 1. In case a knee cap is still present, the cut end 19 may be located adjacent to the rear of the knee cap, so that the knee cap remains intact or at least generally intact.

FIG. 1 further shows that the leg product is arranged in a poultry product carrier 25. The poultry product carrier 25 is part of a poultry products conveyor 25*. The poultry products conveyor 25* comprises a track and a plurality of poultry product carriers 25. The poultry product carriers 25 are spaced apart from one another in the direction of the track and which are movable along said track. Each poultry product carrier 25 is adapted to hold at least one leg product 1 at the tarsal joint side end thereof such that the leg product is conveyed hanging from said carrier.

Figure 2:
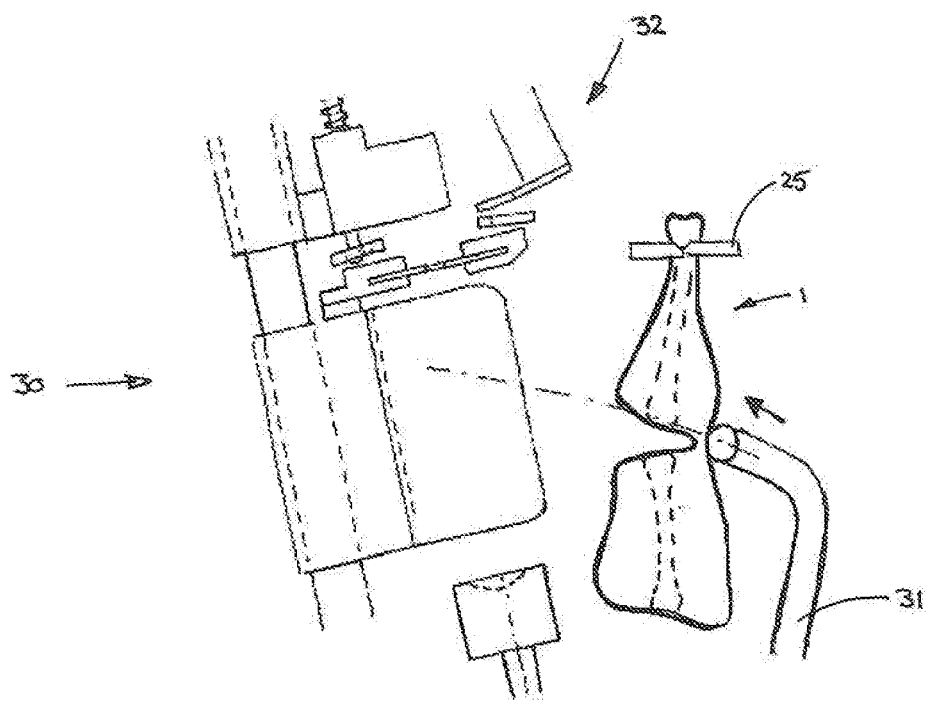

FIG. 2 shows that the leg product 1 is arranged adjacent to an embodiment of a thigh bone remover device 30 according to the invention. The thigh bone remover device 30 comprises a bender device 31 and a thigh bone remover assembly 32.

In this embodiment, the bender device engages the leg product 1 in the vicinity of the connection 15 between the thigh 3 and the drumstick 2, here at the front side of the leg product, but other locations can be suitable for engagement by the bender device 31 as well.

In this embodiment, the bender device 31 brings the leg product 1 towards the thigh bone remover assembly 32. Meanwhile, the leg product 1 remains arranged in poultry product carrier 25.

Figure 3:
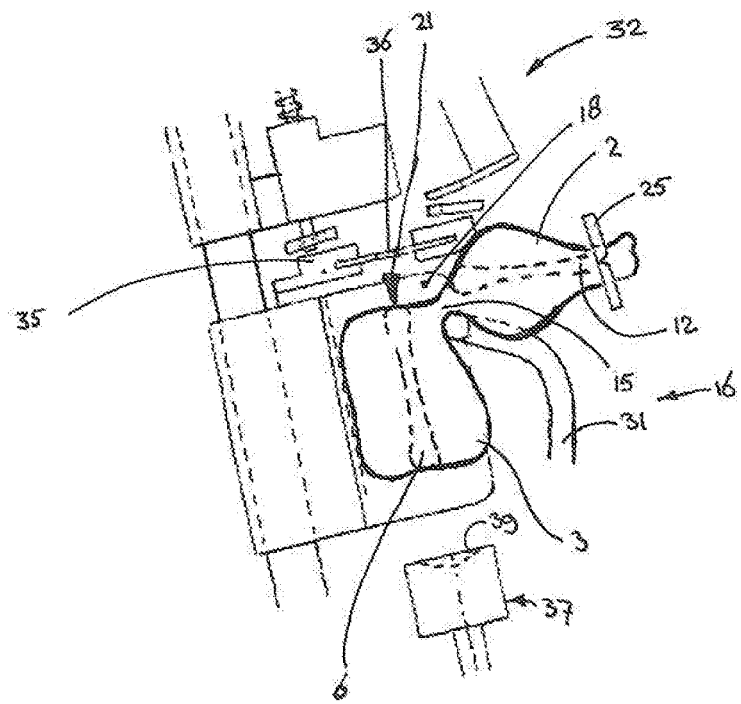

FIG. 3 shows a subsequent stage of the exemplary embodiment of the method according to the invention.

FIG. 3 shows that the bender device 31 has changed the angle between the thigh 3 and the drumstick 2 by bending the leg product 1 at the knee joint 4. Due to this bending, the transverse cut 18 is opened and the thigh side cut plane 21 has become exposed. During this bending the thigh 3 and the drumstick 2 remained connected to each other via connection 15 of the knee joint 4. Furthermore, during this bending—which occurs when the leg product 1 is transferred from the position shown in FIG. 2 to the bent position shown in FIG. 3—, the thigh meat 5 remains on the thigh bone 6 and the drumstick meat 11 remains on the tibia bone 12.

As is shown in FIG. 3, the leg product 1 is in the bent position arranged adjacent to the thigh bone remover assembly 32.

The thigh bone remover assembly 32 comprises a resilient scraper member 35 with a central aperture 36. The exposed thigh side cut plane 21 is arranged adjacent to this resilient scraper member, preferably already with the thigh bone 6 more or less aligned with the central aperture 36.

The central aperture 36 has a diameter that is variable between a minimum diameter and a maximum diameter due to the resilient properties of the scraper member 35. The central aperture 36 is biased towards its minimum diameter, so if no external forces are exerted onto the central aperture 36, the central aperture 36 will have a diameter that equals the minimum diameter. So, when the resilient scraper member 35 is not scraping, the diameter of the central aperture 36 will equal the minimum diameter. The minimum diameter of the central aperture 36 is smaller than the maximum diameter of the knee side condyle 9. In the embodiment shown in FIG. 1-13, the minimum diameter of the central aperture 36 is larger than the thickness of the thigh bone 6 in the region between the knee side condyle 9 and the hip side condyle 10. In embodiments in which leg products are processed of which the thigh bone 6 does not comprise a hip side condyle, optionally the minimum diameter of the central aperture 36 is larger than the thickness of the thigh bone 6 in the region between the knee side condyle 9 and the hip side end 8.

The thigh bone remover assembly 32 further comprises a thigh bone displacement assembly 37. The leg product 1 is arranged with the thigh 3 between the resilient scraper member 35 with the central aperture 36 and the thigh bone displacement assembly 37. The thigh bone displacement assembly 37 is located adjacent to the hip side end 8 of the thigh bone 6. The function of the thigh bone displacement assembly 37 is to force the thigh bone 6 through the central aperture 36 while the transverse cut 18 at the knee joint 4 is kept open and the thigh 3 and the drumstick 2 are kept connected to each other.

In the exemplary embodiment shown in FIG. 1-13, in the bent position, the thigh bone 6 extends substantially vertically while the tibia bone 12 extends substantially horizontally. Initially the tibia bone 12 extended substantially vertically, as can be seen in FIG. 1 and FIG. 2. The changing of orientation of the tibia bone 12 from vertical to horizontal is facilitated by the carrier 25, which a pivot (not shown) that allows to pivot the leg product 1 about a horizontal pivot axis when bending the leg product 1.

As can be seen in FIG. 3, in this exemplary embodiment, the bender device 31 is adapted to rotate the drumstick 2 relative to the thigh 3 about the connection 15 at the knee joint 4 to a bent position in which the smallest angle between the thigh 3 and the drumstick 2 is on the front side 16 of the leg product 1.

Figure 4:
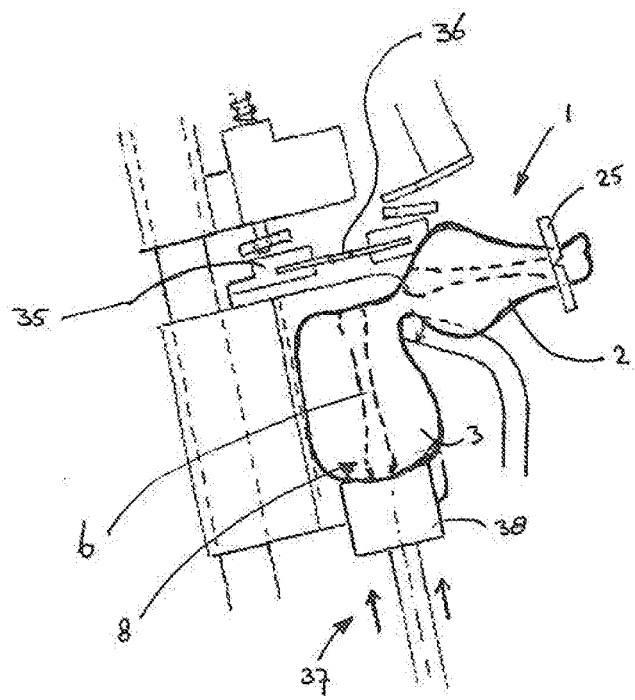

FIG. 4 shows a subsequent stage of the exemplary embodiment of the method according to the invention.

In the embodiment shown in the FIG. 1-13, the thigh bone displacement assembly 37 comprises a pusher 38, here in the form of a moveable pusher block. In the stage of the exemplary embodiment of the method according to the invention that is shown in FIG. 4, the pusher 38 moves towards the thigh 3 of the leg product 1 until it engages the thigh 3 on the hip side. The transverse cut 18 is still opened and the thigh 3 and the drumstick 2 are still connected to each other.

Optionally, the pusher 38 comprises a recess 39 (see FIG. 3) at the side facing the hip side end of the thigh bone. The recess 39 has slanting walls, it is e.g. a generally halfspherical or conical recess. As the thigh bone 6 will provide the strongest resistance when the pusher 38 forces the thigh 3 against the resilient scraper member 35 with the central aperture 36, the hip side end 8 of the thigh bone 6 will assume a position in which said hip side end 8 is located in the deepest part of the recess 39 that it can get into. In the embodiment shown, the pusher 38 is arranged with the deepest part of the recess 39 in line with the center of the central aperture 36 as seen in the direction in which the pusher 38 is moveable. Therewith, the thigh bone 6 will be pushed through the central aperture 36 in a straight line without resulting transverse forces being exerted on the thigh bone 6.

Figure 5:
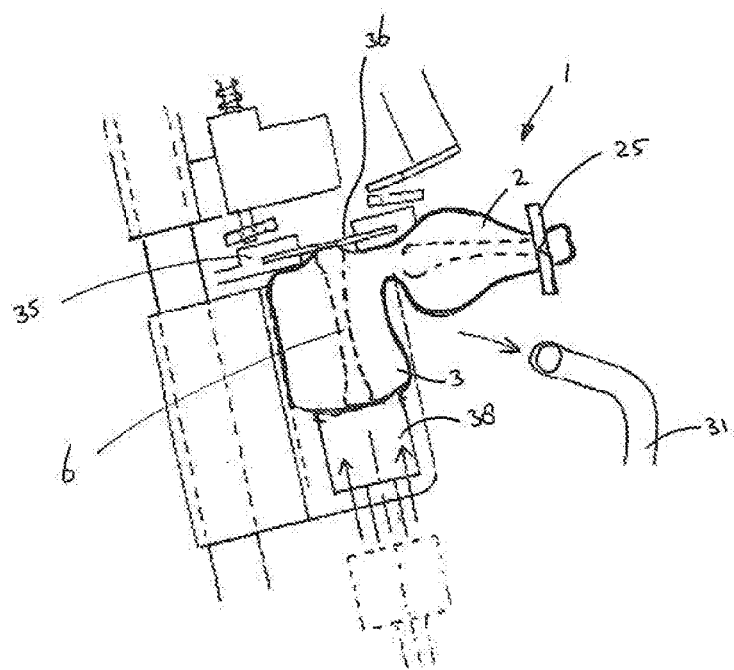

FIG. 5 shows a subsequent stage of the exemplary embodiment of the method according to the invention.

In the stage of the exemplary embodiment of the method according to the invention that is shown in FIG. 5, the pusher 38 moves further towards the resilient scraper member 35 with the central aperture 36. The pusher 38 takes the thigh 3 with it, and pushes the thigh 3 against the resilient scraper member 35 with the central aperture 36. The transverse cut 18 is still opened and the thigh 3 and the drumstick 2 are still connected to each other.

When the thigh 3 is engaged by both the resilient scraper member 35 and by the pusher 38, the bender device 31 can be disengaged and moved away from the leg product 1. Alternatively, it is however possible that the bender device 31 remains in contact with the leg product 1.

Figure 6:
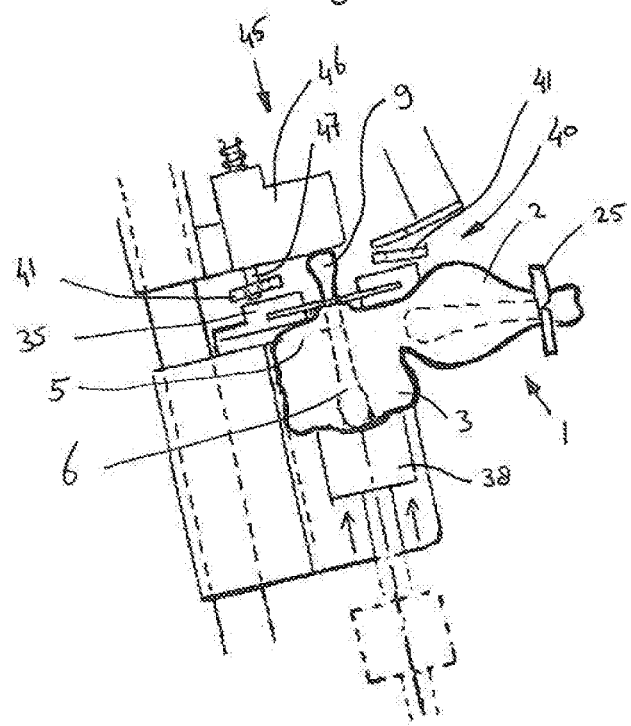

FIG. 6 shows a subsequent stage of the exemplary embodiment of the method according to the invention.

In the stage of the exemplary embodiment of the method according to the invention that is shown in FIG. 6, the pusher 38 moves further towards the resilient scraper member 35 with the central aperture 36. Now, the distance between the pusher 38 and the resilient scraper member 35 with the central aperture 36 is shorter than the length of the thigh bone 6, and the thigh bone is forced into the central aperture 36 and through the resilient scraper member 35 by the pusher 38.

The central aperture 36 has a minimum diameter that is smaller than the maximum diameter of the knee side condyle 9. The knee side condyle 9 forces the diameter of the central aperture 36 to become larger, so that the knee side condyle 9 can pass through. As the central aperture 36 is biased towards its minimum diameter, this causes the edges of the central aperture 36 to lie closely and under some pressure against the knee side condyle 9, and to closely follow the shape of the knee side condyle 9. Therewith, the central aperture 36 severs thigh meat 5 from the knee side condyle 9 in an effective manner. The thigh meat 5 remains generally between the resilient scraper member 35 and the pusher 38.

During all this, the transverse cut 18 is still opened and the thigh 3 and the drumstick 2 are still connected to each other.

In the embodiment of FIG. 1-13, right behind the resilient scraper member 35 with the central aperture 36, on the opposite side of where the pusher 38 is located, a scraper 40 is arranged. In the embodiment shown, the scraper 40 comprises two scraper elements 41.

While the knee side condyle 9 is forced through the central aperture 36, the scraper 40 is in its inactive state. In the inactive state, the scraper elements are arranged at a distance from the thigh bone 6, so that they do not engage the thigh bone 6.

In the embodiment of FIG. 1-13, a scraper activator 45 is provided. The scraper activator 45 in this embodiment comprises a movable block 46 with a locking pin 47. The locking pin 47 is fixed to the moveable trigger block 46. The moveable trigger block 46 is arranged in the path of the thigh bone 6 when it is moved by the pusher 38. The locking pin 47 holds the scraper 40 in its inactive position, by locking the scraper elements 41 in a position away from the thigh bone 6. Optionally a separate locking pin is provided for each scraper element 41. Alternatively, the scraper elements 41 are connected to each other, e.g. by gear toothing, to move together (e.g. towards each other or away from each other). In that case, a single locking pin 47 is sufficient.

Figure 7:
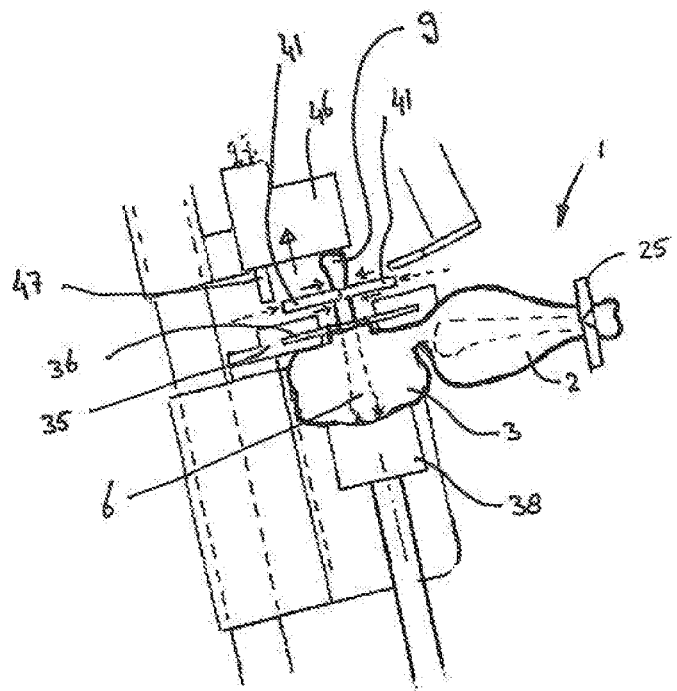

FIG. 7 shows a subsequent stage of the exemplary embodiment of the method according to the invention.

In the stage of the exemplary embodiment of the method according to the invention that is shown in FIG. 7, the pusher 38 moves further towards the resilient scraper member 35 with the central aperture 36. Now, the knee side condyle 9 has been forced through the central aperture 36 entirely.

The knee side condyle 9 protrudes so far through the central aperture 36 that it engages the moveable trigger block 46 of the scraper activator 45. As the pusher 38 pushes the thigh bone 6 further through the central aperture 36, the knee side condyle 9 moves the moveable trigger block 46 away from the resilient scraper member 35 with the central aperture 36. By this movement of the moveable trigger block 46, the locking pin 47 becomes disengaged from the scraper 40.

In this embodiment, the scraper 40 is biased towards it active position. So, when the locking pin 47 releases the scraper 40, the scraper 40 gets into its active position, with the scraper elements 41 engaging the thigh bone between the knee side condyle 9 and the hip side end 8.

So, in the embodiment shown in FIG. 1-13, the knee side condyle 9 of the thigh bone 6 operates the scraper 40. The scraper 40 only becomes active after the thigh bone 6 already protrudes through the central aperture over a certain, predetermined protrusion trigger length. Alternatively, the length over which the thigh bone 6 protrudes through the central aperture 36 can for example be detected by a sensor or switch, which then activates the scraper 40 once the predetermined protrusion trigger length has been reached.

The thigh meat that is already severed from the thigh bone 6 generally remains in the area between the resilient scraper member 35 with the central aperture 36 and the pusher 38. The resilient scraper member 35 with the central aperture 36 prevents that severed thigh meat gets caught between the scraper elements 41, and therewith prevents damage to the thigh meat.

During all this, the transverse cut 18 is still opened and the thigh 3 and the drumstick 2 are still connected to each other.

Figure 8:
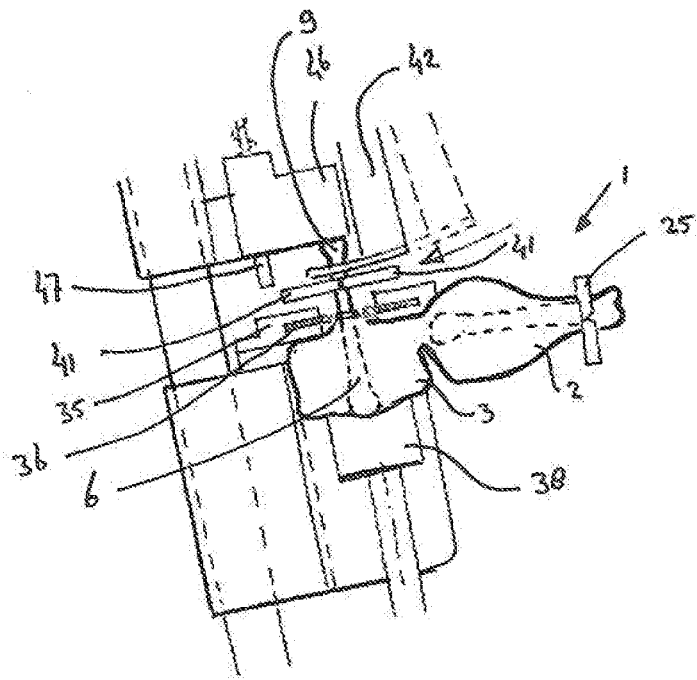

FIG. 8 shows a subsequent stage of the exemplary embodiment of the method according to the invention.

In the stage of the exemplary embodiment of the method according to the invention that is shown in FIG. 8, the pusher 38 moves further towards the resilient scraper member 35 with the central aperture 36. Now, the knee side condyle 9 has been forced through the central aperture 36 entirely, and also a part of the thigh bone 6 between the knee side condyle 9 and the hip side condyle 10 has passed through the central aperture 36 of the resilient scraper member 35.

In the embodiment shown in FIG. 1-13, the minimum diameter of the central aperture 36 is larger than the diameter of the thigh bone 6 in the region between the knee side condyle 9 and the hip side condyle 10. So, the central aperture 36 does not sever thigh meat from the thigh bone in the region between the knee side condyle 9 and the hip side condyle 10. In this region, the thigh meat is severed from the thigh bone 6 by the scraper 40.

When the stage of the exemplary embodiment of the method according to the invention that is shown in FIG. 8 is reached, a little of the thigh bone 6 behind the knee side condyle has passed through the scraper 40. So, there now is some space between the scraper elements 41 of the scraper 40 and the knee side condyle 9.

In the embodiment shown in FIG. 1-13, the thigh bone remover assembly further comprises a puller 42. The puller 42 is adapted to exert a pulling force on the thigh bone 6 in order to move the thigh bone 6 relative to the scraper 40.

The puller 42 has been in an inactive state during the method stages shown in FIG. 1-7, but now it is transferred into its active state, in which it engages the thigh bone 6 just behind the knee side condyle 9.

During all this, the transverse cut 18 is still opened and the thigh 3 and the drumstick 2 are still connected to each other.

Figure 9:
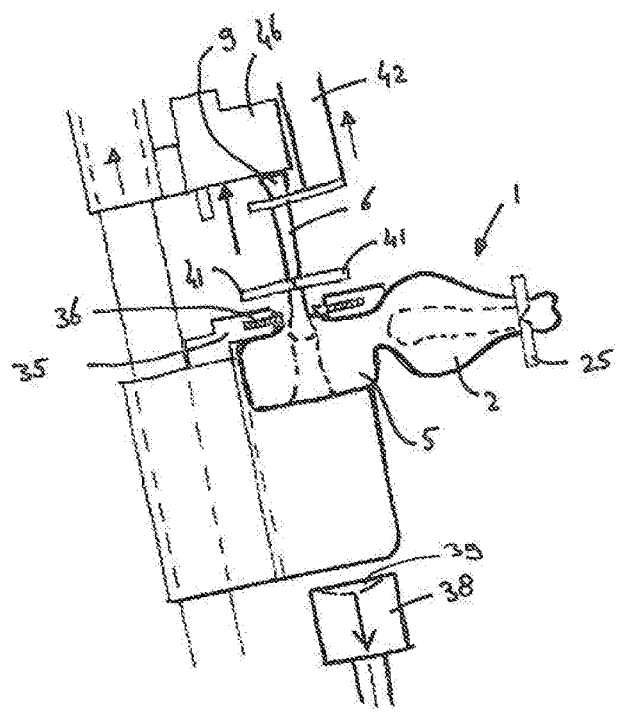

FIG. 9 shows a subsequent stage of the exemplary embodiment of the method according to the invention.

In the stage of the exemplary embodiment of the method according to the invention that is shown in FIG. 9, the puller 42 takes the task of moving the thigh bone 6 relative to the scraper 40 over from the pusher 38. The pusher 38 can now be returned to its initial position, and is moved away from the resilient scraper member 35 with the central aperture 36.

The puller 42 pulls the thigh bone 6 through the scraper 40 until the hip side condyle 10 reaches the scraper elements 41. The scraper 40 severs the thigh meat from the thigh bone in the region between the knee side condyle 9 and the hip side condyle 10. The thigh meat 5 that is severed from the thigh bone remains in the area between the resilient scraper member 35 with the central aperture 36 and the pusher 38.

In case a leg product 1 is processed of which the thigh bone does not contain a hip side condyle, the scraper 40 can scrape the thigh meat from the thigh bone all the way to the hip side end of the thigh bone.

During all this, the transverse cut 18 is still opened and the thigh 3 and the drumstick 2 are still connected to each other.

Figure 10:
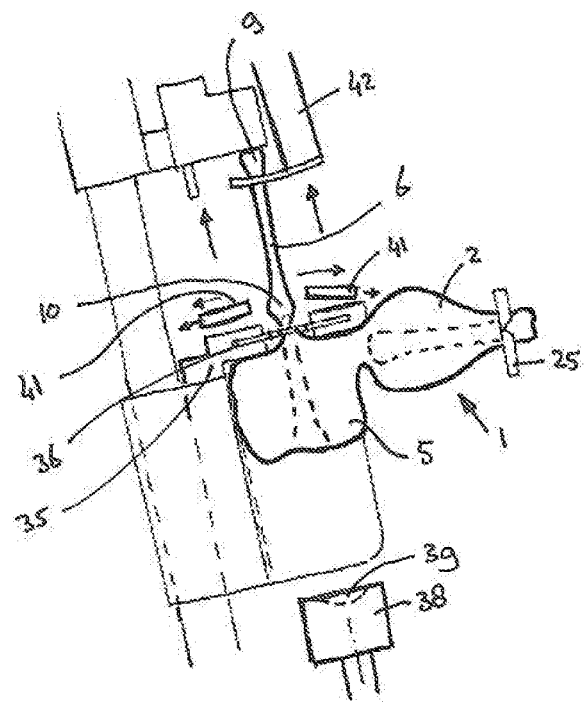

FIG. 10 shows a subsequent stage of the exemplary embodiment of the method according to the invention.

In the stage of the exemplary embodiment of the method according to the invention that is shown in FIG. 10, the puller 42 moves the thigh bone further relative to the scraper 40. The scraper elements 41 are moved away from each other in order to allow the hip side condyle 10 to pass. The puller 42 pulls the hip side condyle 10 through the central aperture 36. In the embodiment shown in FIG. 1-13, the diameter range of the central aperture 36 is selected such that the central aperture severs thigh meat from the hip side condyle 10 in the same way as in which it severed thigh meat from the knee side condyle 9.

In an alternative embodiment, the scraper elements 41 move away from each other just enough to let the hip side condyle 10 pass through, however still maintaining engagement with the thigh bone, so the scraping action can be maintained to the hip side end 8 of the thigh bone 6.

Figure 11:
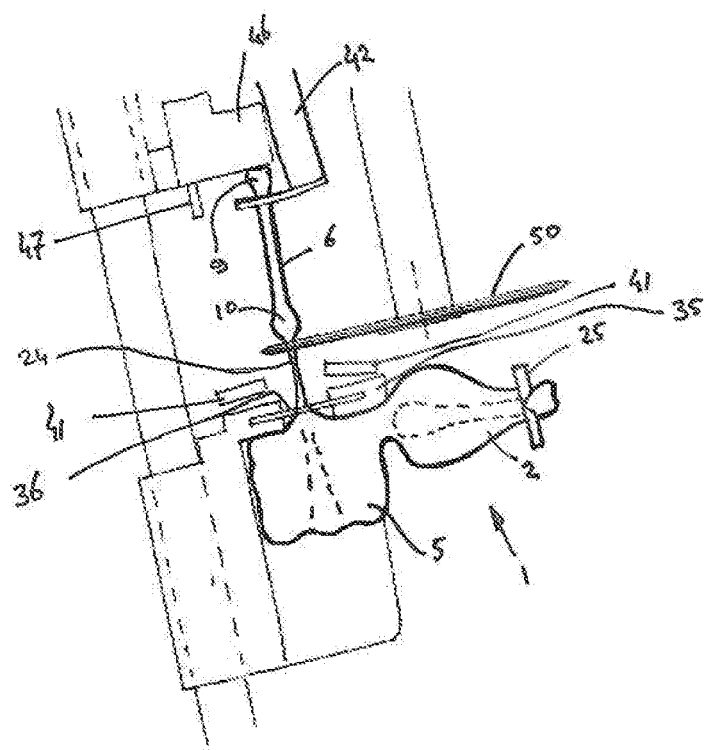

FIG. 11 shows a subsequent stage of the exemplary embodiment of the method according to the invention.

In the stage of the exemplary embodiment of the method according to the invention that is shown in FIG. 11, the puller 42 moves the thigh bone further relative to the scraper 40. In this stage, there is just a small connection 24 remaining between the thigh meat 5 and thigh bone 6. This connection 24 may comprise meat, ligaments, a tendon or an other type of tissue connection.

To sever this connection 24, a finisher cutter 50 is provided. In the embodiment shown, the finisher cutter 50 is a rotatable disk shaped knife, however other types of cutters (e.g. a stationary knife) can be used as alternatives. The finisher cutter 50 is for example part of a thigh meat harvester or a knee meat and thigh meat harvester.

Figure 12:
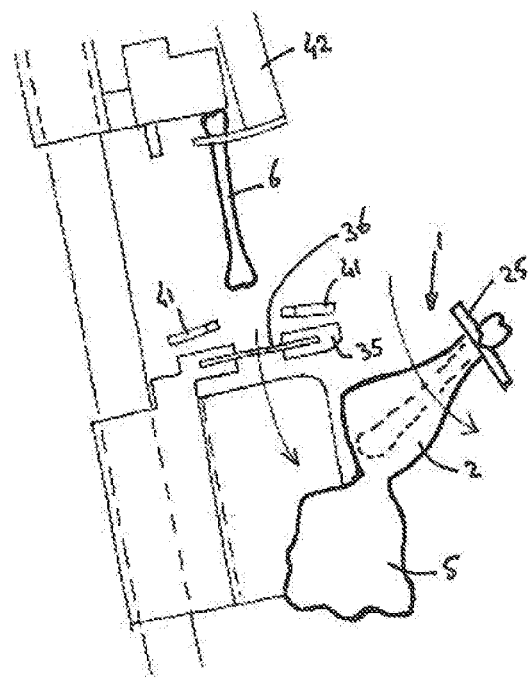

FIG. 12 shows a subsequent stage of the exemplary embodiment of the method according to the invention.

The thigh bone 6 and the thigh meat 5 are now completely severed from each other. The thigh meat 5 is still connected to the drumstick 2.

The drumstick 2 can now return to a substantially vertical position, due to the pivot in the poultry product carrier.

Figure 13:
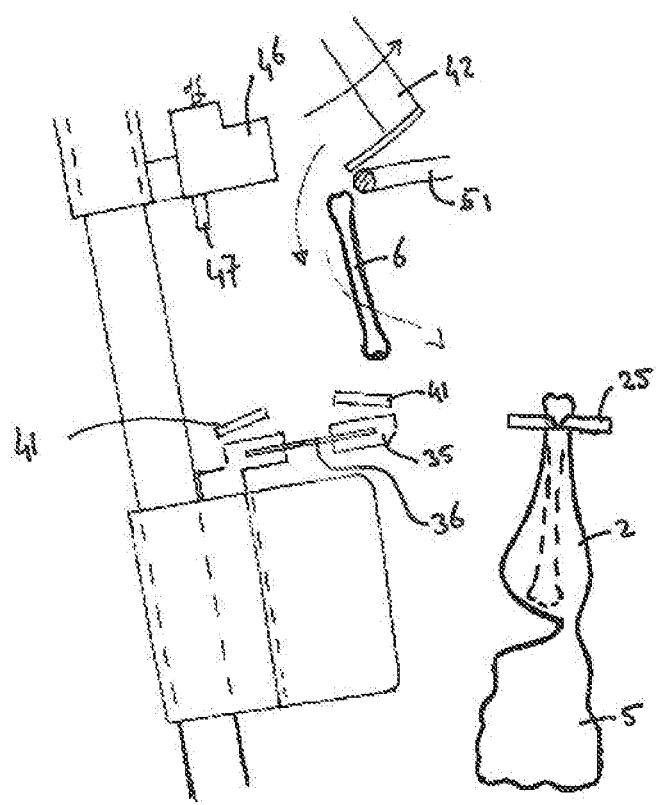

FIG. 13 shows a subsequent stage of the exemplary embodiment of the method according to the invention.

The embodiment shown comprises a knock out device 51, which engages the severed thigh bone 6 which is still engaged by the puller. Due to the action of the knock out device 51, the thigh bone 6 is released from the puller 42.

Figure 14:
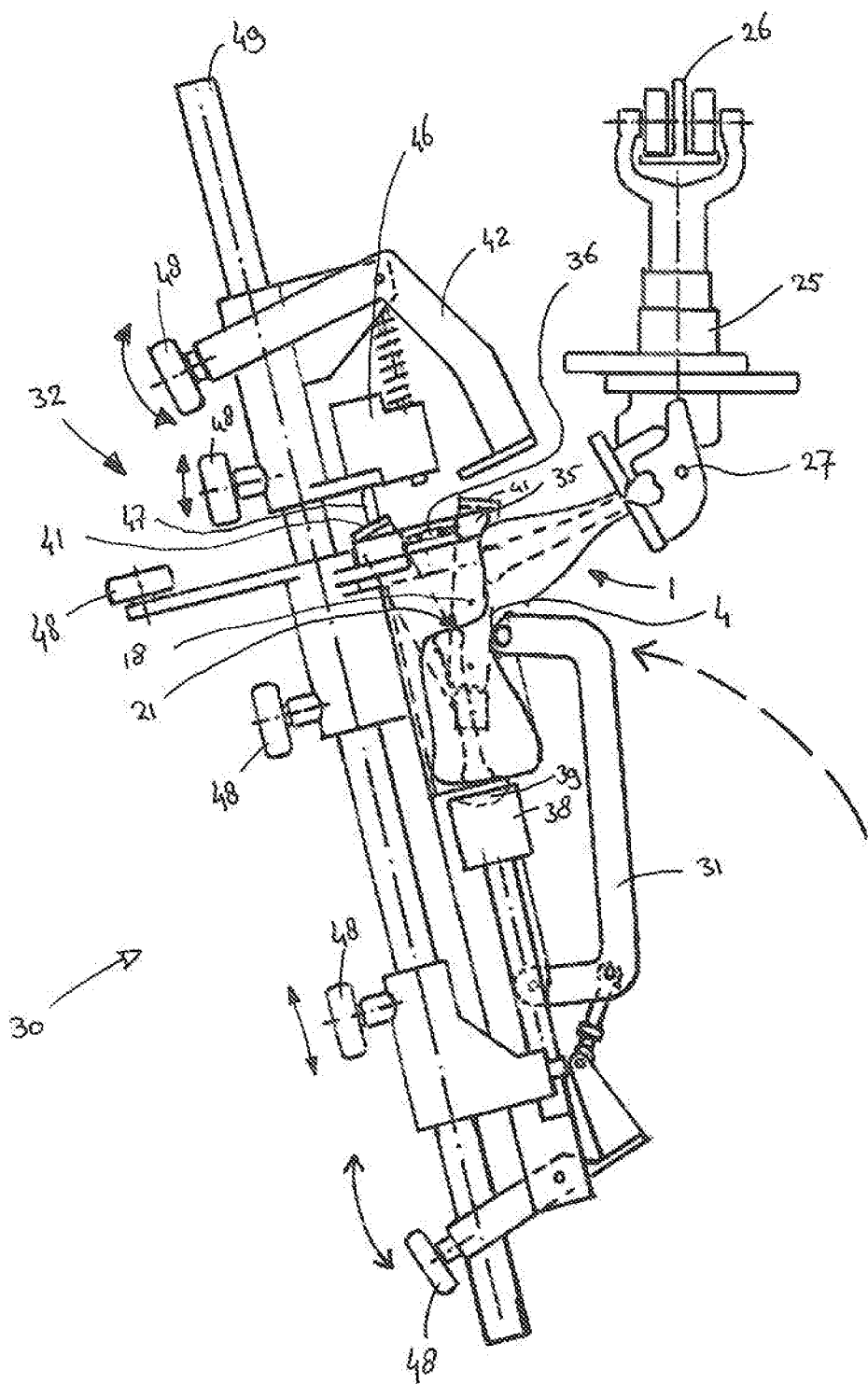
FIG. 14: illustrates an embodiment of the system according to the invention in more detail.

FIG. 14 shows an embodiment of the system according to the invention in more detail. The system of FIG. 14 is similar to the system shown in FIG. 1-13.

The system of FIG. 14 comprises poultry products having a track 26 and a plurality of poultry product carriers 25, of which plurality one poultry product carrier is shown. The poultry product carrier 25 comprises a pivot 27 that allows to pivot the defeathered whole leg poultry product 1 about a horizontal pivot axis when bending the defeathered whole leg poultry product 1.

The system of FIG. 14 comprises a thigh bone remover device 30, which comprises a bender device 31 and a thigh bone remover assembly 32. The bender device 31 is moveable between a position away from the leg product 1 and a position in which it engages the leg product 1 and bends it such that the transverse cut 18 at the knee joint 4 is open and the thigh side cut plane 21 exposed.

The thigh bone remover assembly 32 comprises a pusher 38 with a recess 39, a resilient scraper member 35 with a central aperture 36, scraper elements 41 and a puller 42. Furthermore, a moveable trigger block 46 with a locking pin 4 is provided.

The operation of the system of FIG. 14 is the same as described in relation to the embodiment of FIG. 1-13.

FIG. 14 shows that some of the individual elements of the thigh bone remover device 30 are provided with cam followers 48. The cam followers 48 cooperate with a cam track, which can for example be provided in a carrousel machine, to actuate the element of the thigh bone remover device 30 to which they are connected, for example moving said element up and down along a guide 49 or pivoting said element about a pivot point.

Figure 15:
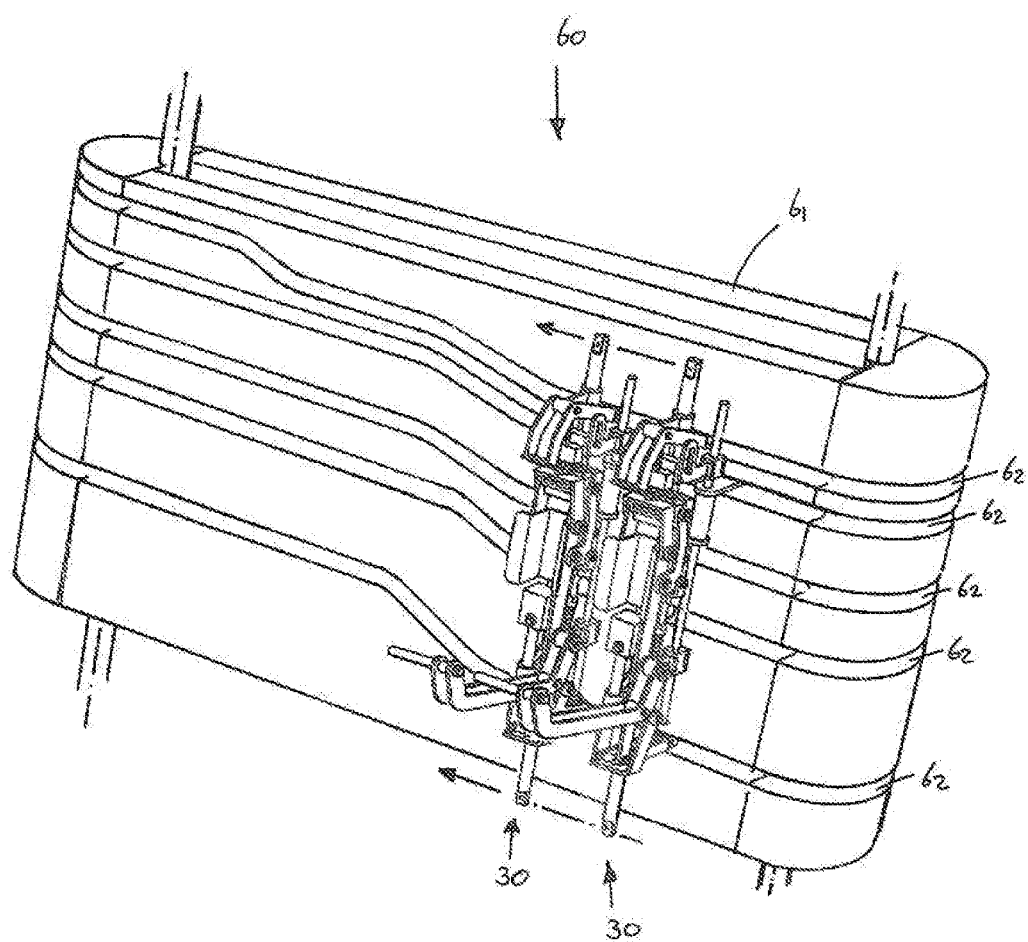
FIG. 15: illustrates thigh bone remover devices which are arranged in a carrousel machine 60.

FIG. 15 shows two thigh bone remover devices 30 which are arranged in a carrousel machine 60. The carrousel machine 60 comprises a central body 61, which is provided with cam tracks 62. The central body 61 is stationary and the thigh bone remover devices 30 are moved around the central body 61.

In the embodiment of FIG. 15, the central body 61 has an elongate shape with curved ends, so the path that is followed by the thigh bone remover devices 30 comprises two parallel straight lines that are connected by two curved lines. Alternatively, the central body can have a different shape, so the thigh bone remover devices 30 follow a path with a different shape. For example, the central body can be cylindrical with a circular cross section or frusto-conical, so that the path that is followed by the thigh bone remover devices 30 is circular.

The cam tracks 62 cooperate with cam followers that are provided on the thigh bone remover devices 30, e.g. like the cam followers 48 shown in FIG. 14. The cam tracks 62 and cam followers together actuate the element of the thigh bone remover device 30 to which they are connected, for example moving said element up and down along a guide 49 or pivoting said element about a pivot point.

The thigh bone remover devices 30 move along with poultry product carriers that hold a defeathered whole leg poultry product over at least a part of the path that the thigh bone remover devices 30 follow. When the thigh bone remover device 30 moves along with a poultry product carrier that hold a defeathered whole leg poultry product, the thigh bone remover device 30 removes the thigh bone from the defeathered whole leg poultry product, preferably by using the method according to the invention.

Any suitable number of thigh bone remover devices may be arranged in the carrousel machine.

Figure 16:
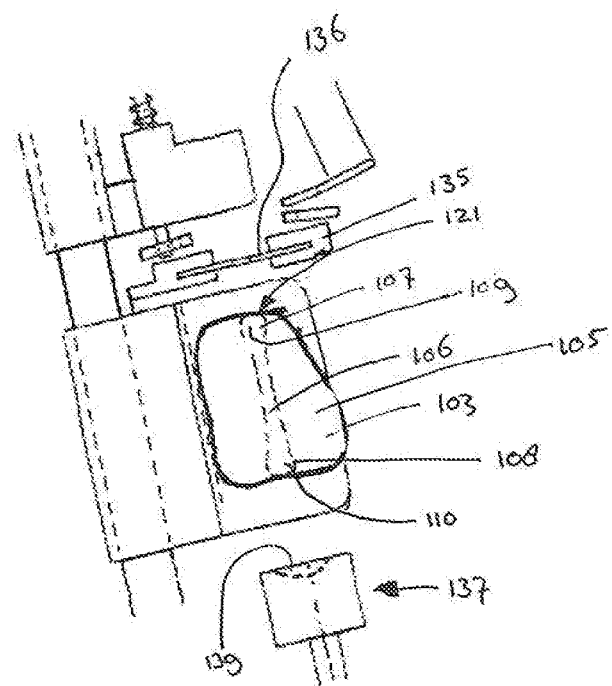
FIG. 16-25: illustrate subsequent stages of an exemplary embodiment of the method according to the invention which is carried out in an embodiment of a system according to the invention in which the thigh bone is removed from a thigh that is no longer connected to a drumstick.

FIG. 16-25 show subsequent stages of an exemplary embodiment of the method according to the invention which is carried out in an embodiment of a system according to the invention in which the thigh bone is removed from a thigh that is no longer connected to a drumstick FIG. 16 shows that a poultry thigh 103 is provided. The poultry thigh 103 comprises at least a thigh bone 106 and thigh meat 105 and a thigh side cut plane 121. The thigh bone 106 has a knee side end 107 and a hip side end 108. The thigh bone 106 comprises a knee side condyle 109 and in this embodiment also a hip side condyle 110.

The system shown in FIG. 16 comprises a resilient scraper member 135 with a central aperture 136. The exposed thigh side cut plane 121 is arranged adjacent to this resilient scraper member, preferably already with the thigh bone 106 more or less aligned with the central aperture 136.

The central aperture 136 has a diameter that is variable between a minimum diameter and a maximum diameter due to the resilience of the resilient scraper member. The central aperture 136 is biased towards its minimum diameter, so if no external forces are exerted onto the central aperture 136, the central aperture 136 will have a diameter that equals the minimum diameter. The minimum diameter of the central aperture 136 is smaller than the maximum diameter of the knee side condyle 109. In the embodiment shown in FIG. 16-25, the minimum diameter of the central aperture 136 is larger than the thickness of the thigh bone 106 in the region between the knee side condyle 109 and the hip side condyle 110. In embodiments in which thighs are processed of which the thigh bone 106 does not comprise a hip side condyle, optionally the minimum diameter of the central aperture 136 is larger than the thickness of the thigh bone 106 in the region between the knee side condyle 109 and the hip side end 108.

The system of FIG. 16 further comprises a thigh bone displacement assembly 137. The thigh 103 is arranged between the resilient scraper member 135 with the central aperture 136 and the thigh bone displacement assembly 137. The thigh bone displacement assembly 137 is located adjacent to the hip side end 108 of the thigh bone 106. The function of the thigh bone displacement assembly 137 is to force the thigh bone 106 through the central aperture 136.

Figure 17:
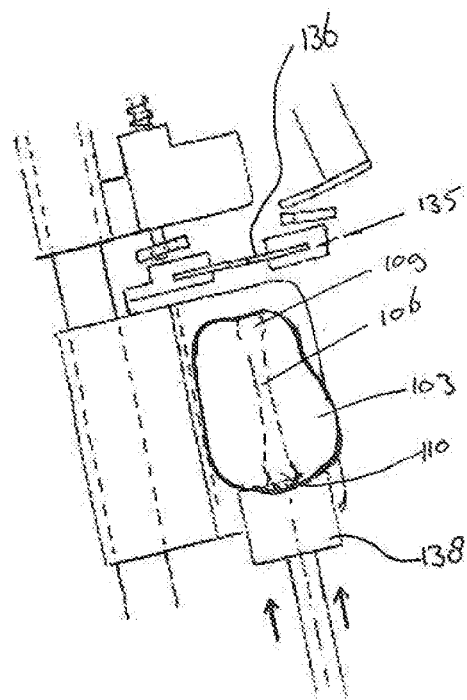

FIG. 17 shows a subsequent stage of the exemplary embodiment of the method according to the invention.

In the embodiment shown in the FIG. 16-25, the thigh bone displacement assembly 137 comprises a pusher 138 in the form of a moveable pusher block. In the stage of the exemplary embodiment of the method according to the invention that is shown in FIG. 17, the pusher 138 moves towards the thigh 103 until it engages the thigh 103 on the hip side.

Optionally, the pusher 138 comprises a recess 139 (see FIG. 16) at the side facing the hip side end of the thigh bone. The recess 139 has slanting walls, it is e.g. a generally half-spherical or conical recess. As the thigh bone 106 will provide the strongest resistance when the pusher 138 forces the thigh 103 against the resilient scraper member 135 with the central aperture 136, the hip side end 108 of the thigh bone 106 will assume a position in which said hip side end 108 is located in the deepest part of the recess 139 that it can get into. In the embodiment shown, the pusher 138 is arranged in line with the deepest part of the recess 139 in line with the center of the central aperture 316 as seen in the direction in which the pusher 138 is moveable. Therewith, the thigh bone 106 will be pushed through the central aperture 136 in a straight line without resulting transverse forces being exerted on the thigh bone 106.

Figure 18:
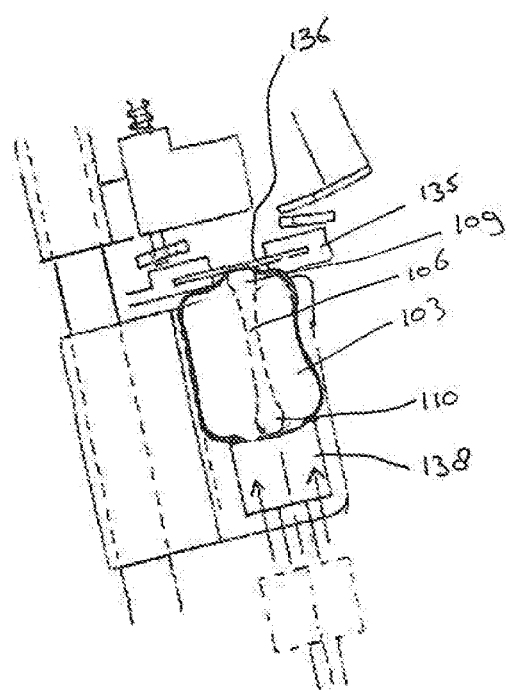

FIG. 18 shows a subsequent stage of the exemplary embodiment of the method according to the invention.

In the stage of the exemplary embodiment of the method according to the invention that is shown in FIG. 18, the pusher 138 moves further towards the resilient scraper member 135 with the central aperture 136. The pusher 138 takes the thigh 103 with it, and pushes the thigh 103 against the resilient scraper member 135 with the central aperture 136.

Figure 19:
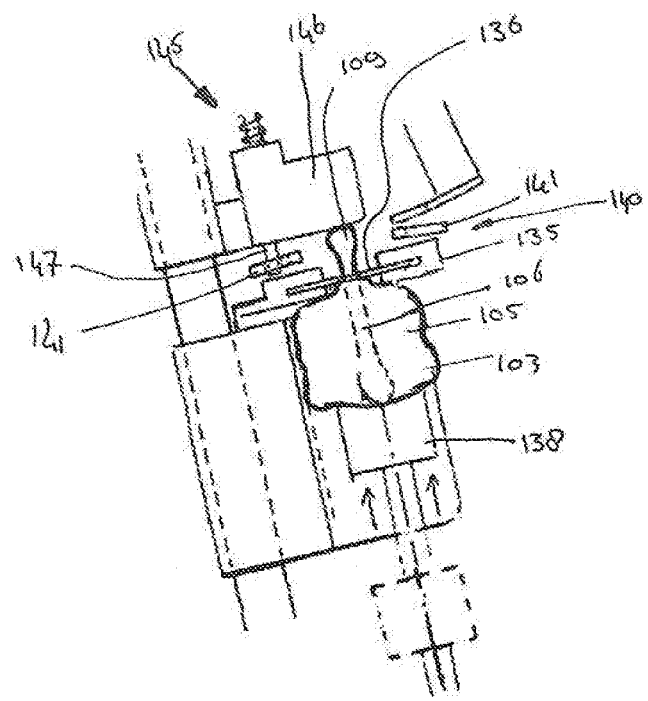

FIG. 19 shows a subsequent stage of the exemplary embodiment of the method according to the invention.

In the stage of the exemplary embodiment of the method according to the invention that is shown in FIG. 19, the pusher 138 moves further towards the resilient scraper member 135 with the central aperture 136. Now, the distance between the pusher 138 and the resilient scraper member 135 with the central aperture 136 is shorter than the length of the thigh bone 106, and the thigh bone is forced through the central aperture 136 by the pusher 138.

The central aperture 136 has a minimum diameter that is smaller than the maximum diameter of the knee side condyle 109. The knee side condyle 109 forces the diameter of the central aperture 136 to become larger, so that the knee side condyle 109 can pass through. As the central aperture 136 is biased towards its minimum diameter, this causes the edges of the central aperture 136 to lie closely and under some pressure against the knee side condyle 109, and to closely follow the shape of the knee side condyle 109. Therewith, the central aperture 136 severs thigh meat 105 from the knee side condyle 109 in an effective manner. The thigh meat 105 remains generally between the resilient scraper member 135 and the pusher 138.

In the embodiment of FIG. 16-25, right behind the resilient scraper member 135 with the central aperture 136, on the opposite side of where the pusher 138 is located, a scraper 140 is arranged. In the embodiment shown, the scraper 140 comprises two scraper elements 141.

While the knee side condyle 109 is forced through the central aperture 136, the scraper 140 is in its inactive state. In the inactive state, the scraper elements are arranged at a distance from the thigh bone 106, so that they do not engage the thigh bone 106.

In the embodiment of FIG. 16-25, a scraper activator 145 is provided. The scraper activator 145 in this embodiment comprises a movable block 146 with a locking pin 147. The locking pin 147 is fixed to the moveable trigger block 146. The moveable trigger block 146 is arranged in the path of the thigh bone 106 when it is moved by the pusher 138. The locking pin 147 holds the scraper 140 in its inactive position, by locking the scraper elements 141 in a position away from the thigh bone 106. Optionally a separate locking pin is provided for each scraper element 141. Alternatively, the scraper elements 141 are connected to each other, e.g. by gear toothing, to move together (e.g. towards each other or away from each other). In that case, a single locking pin 147 is sufficient.

Figure 20:
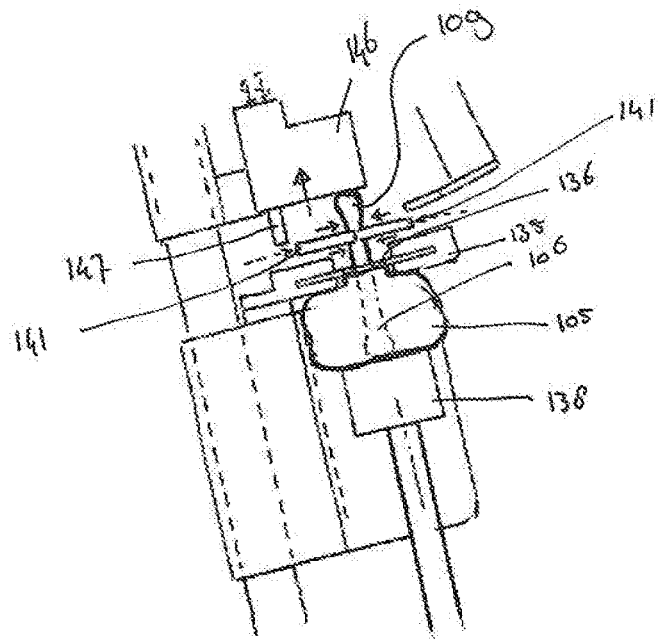

FIG. 20 shows a subsequent stage of the exemplary embodiment of the method according to the invention.

In the stage of the exemplary embodiment of the method according to the invention that is shown in FIG. 20, the pusher 138 moves further towards the resilient scraper member 135 with the central aperture 136. Now, the knee side condyle 109 has been forced through the central aperture 136 entirely.

The knee side condyle 109 protrudes so far through the central aperture 136 that it engages the moveable trigger block 146 of the scraper activator 145. As the pusher 138 pushes the thigh bone 106 further through the central aperture 136, the knee side condyle 109 moves the moveable trigger block 146 away from the resilient scraper member 135 with the central aperture 136. By this movement of the moveable trigger block 146, the locking pin 147 becomes disengaged from the scraper 140.

In this embodiment, the scraper 140 is biased towards it active position. So, when the locking pin 147 releases the scraper 140, the scraper 140 gets into its active position, with the scraper elements 141 engaging the thigh bone between the knee side condyle 109 and the hip side end 108.

So, in the embodiment shown in FIG. 16-25, the knee side condyle 109 of the thigh bone 106 operates the scraper 140. The scraper 140 only becomes active after the thigh bone 106 already protrudes through the central aperture over a certain, predetermined protrusion trigger length. Alternatively, the length over which the thigh bone 106 protrudes through the central aperture 136 can for example be detected by a sensor or switch, which then activates the scraper 140 once the predetermined protrusion trigger length has been reached.

The thigh meat that is already severed from the thigh bone 106 generally remains in the area between the resilient scraper member 135 with the central aperture 136 and the pusher 138. The resilient scraper member 135 with the central aperture 136 prevents that severed thigh meat gets caught between the scraper elements 141, and therewith prevents damage to the thigh meat.

Figure 21:
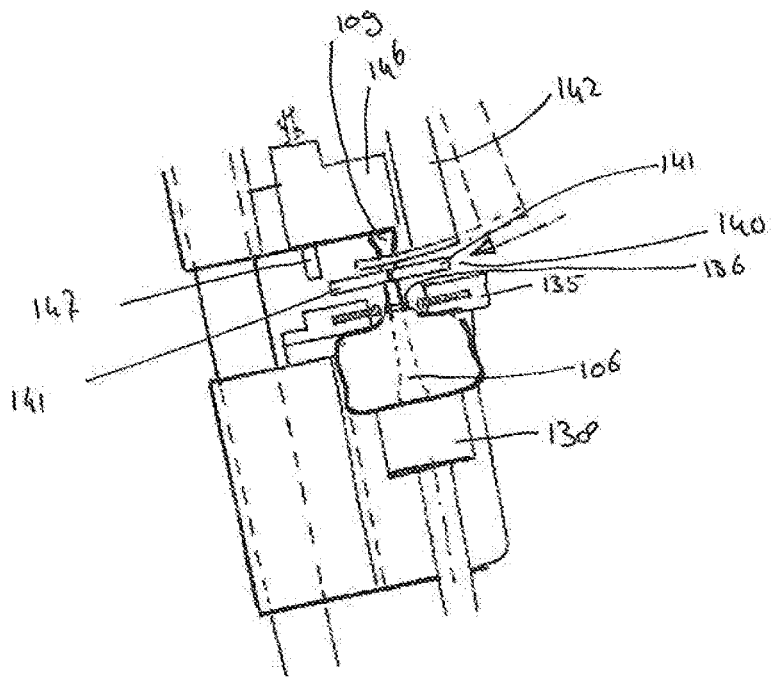

FIG. 21 shows a subsequent stage of the exemplary embodiment of the method according to the invention.

In the stage of the exemplary embodiment of the method according to the invention that is shown in FIG. 21, the pusher 138 moves further towards the resilient scraper member 135 with the central aperture 136. Now, the knee side condyle 109 has been forced through the central aperture 136 entirely, and also a part of the thigh bone 106 between the knee side condyle 109 and the hip side condyle 110 has passed through the central aperture 136.

In the embodiment shown in FIG. 16-25, the minimum diameter of the central aperture 136 is larger than the diameter of the thigh bone 106 in the region between the knee side condyle 109 and the hip side condyle 110. So, the central aperture 136 does not sever thigh meat from the thigh bone in the region between the knee side condyle 109 and the hip side condyle 110. In this region, the thigh meat is severed from the thigh bone 106 by the scraper 40.

When the stage of the exemplary embodiment of the method according to the invention that is shown in FIG. 21 is reached, a little of the thigh bone 106 behind the knee side condyle has passed through the scraper 140. So, there now is some space between the scraper elements 141 of the scraper 140 and the knee side condyle 109.

In the embodiment shown in FIG. 16-25, the thigh bone remover assembly further comprises a puller 142. The puller 142 is adapted to exert a pulling force on the thigh bone 106 in order to move the thigh bone 106 relative to the scraper 140.

The puller 142 has been in an inactive state during the method stages shown in FIG. 16-20, but now it is transferred into its active state, in which it engages the thigh bone 106 just behind the knee side condyle 109.

Figure 22:
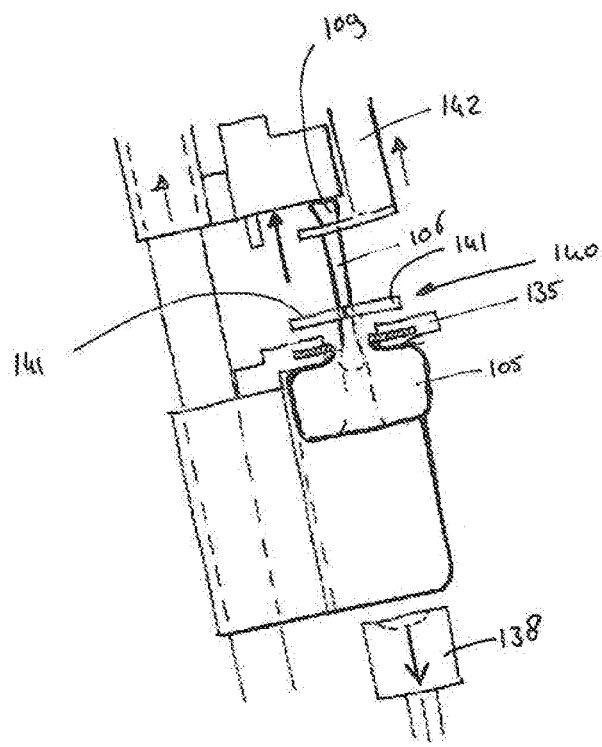

FIG. 22 shows a subsequent stage of the exemplary embodiment of the method according to the invention.

In the stage of the exemplary embodiment of the method according to the invention that is shown in FIG. 22, the puller 142 takes the task of moving the thigh bone 106 relative to the scraper 140 over from the pusher 138. The pusher 138 can now be returned to its initial position, and is moved away from the resilient scraper member 135 with the central aperture 136.

The puller 142 pulls the thigh bone 106 through the scraper 140 until the hip side condyle 110 reaches the scraper elements 141. The scraper 140 severs the thigh meat from the thigh bone in the region between the knee side condyle 109 and the hip side condyle 110. The thigh meat 105 that is severed from the thigh bone remains in the area between the resilient scraper member 135 with the central aperture 136 and the pusher 138.

In case a thigh is processed which does not contain a hip side condyle, the scraper 140 can scrape the thigh meat from the thigh bone all the way to the hip side end of the thigh bone.

Figure 23:
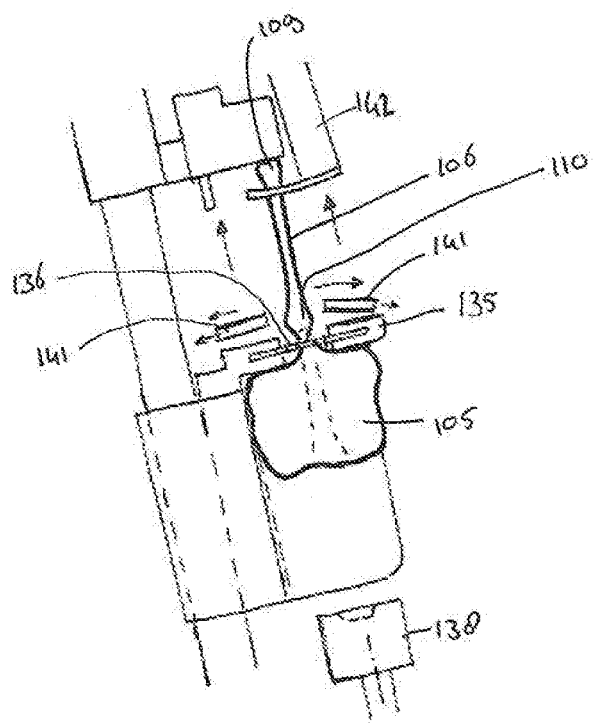

FIG. 23 shows a subsequent stage of the exemplary embodiment of the method according to the invention.

In the stage of the exemplary embodiment of the method according to the invention that is shown in FIG. 23, the puller 142 moves the thigh bone further relative to the scraper 140. The scraper elements 141 are moved away from each other in order to allow the hip side condyle 110 to pass. The puller 142 pulls the hip side condyle 110 through the central aperture 36.

In the embodiment shown in FIG. 16-25, the diameter range of the central aperture 136 is selected such that the central aperture severs thigh meat from the hip side condyle 110 in the same way as in which it severed thigh meat from the knee side condyle 109.

In an alternative embodiment, the scraper elements 141 move away from each other just enough to let the hip side condyle 110 pass through, however still maintaining engagement with the thigh bone, so the scraping action can be maintained to the hip side end 108 of the thigh bone 106.

Figure 24:
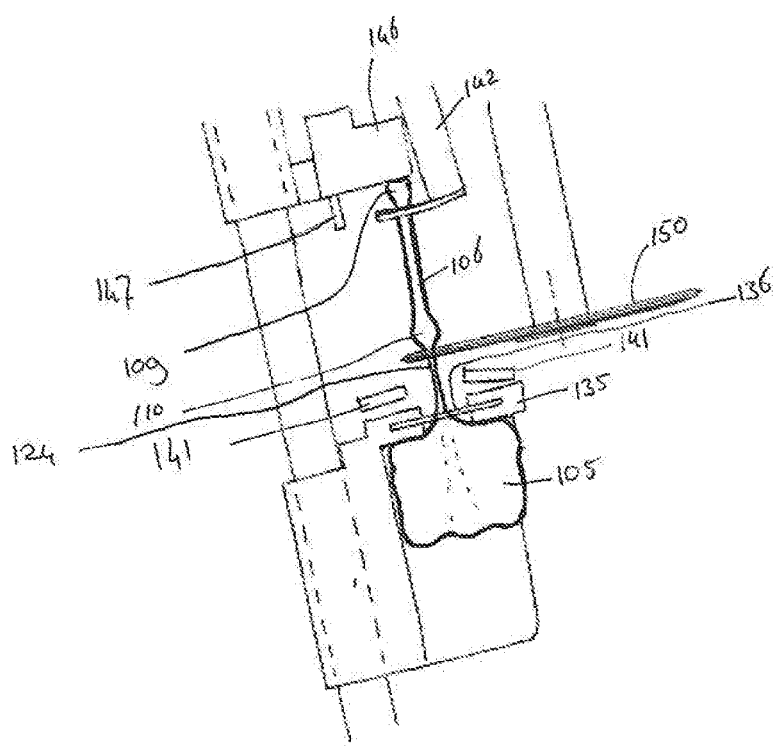

FIG. 24 shows a subsequent stage of the exemplary embodiment of the method according to the invention.

In the stage of the exemplary embodiment of the method according to the invention that is shown in FIG. 24, the puller 142 moves the thigh bone further relative to the scraper 140. In this stage, there is just a small connection 124 remaining between the thigh meat 105 and thigh bone 106. This connection 124 may comprise meat, ligaments, a tendon or an other type of tissue connection.

To sever this connection 124, a finisher cutter 150 is provided. In the embodiment shown, the finisher cutter 150 is a rotatable disk shaped knife, however other types of cutters (e.g. a stationary knife) can be used as alternatives. The finisher cutter 150 is for example part of a thigh meat harvester or a knee meat and thigh meat harvester.

Figure 25:
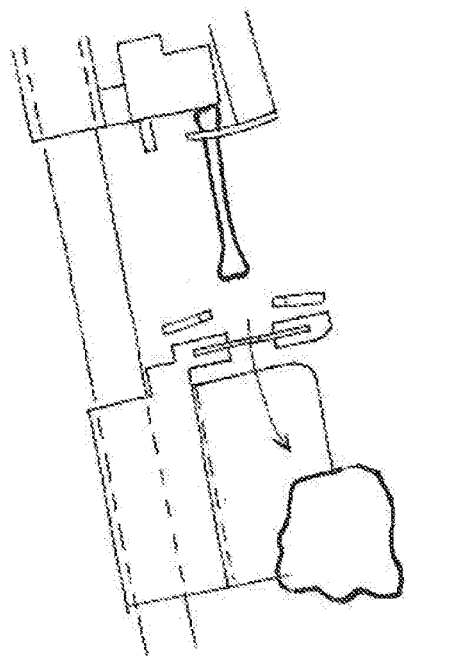

FIG. 25 shows a subsequent stage of the exemplary embodiment of the method according to the invention.

The thigh bone 106 and the thigh meat 105 are now completely severed from each other.

Figure 26:
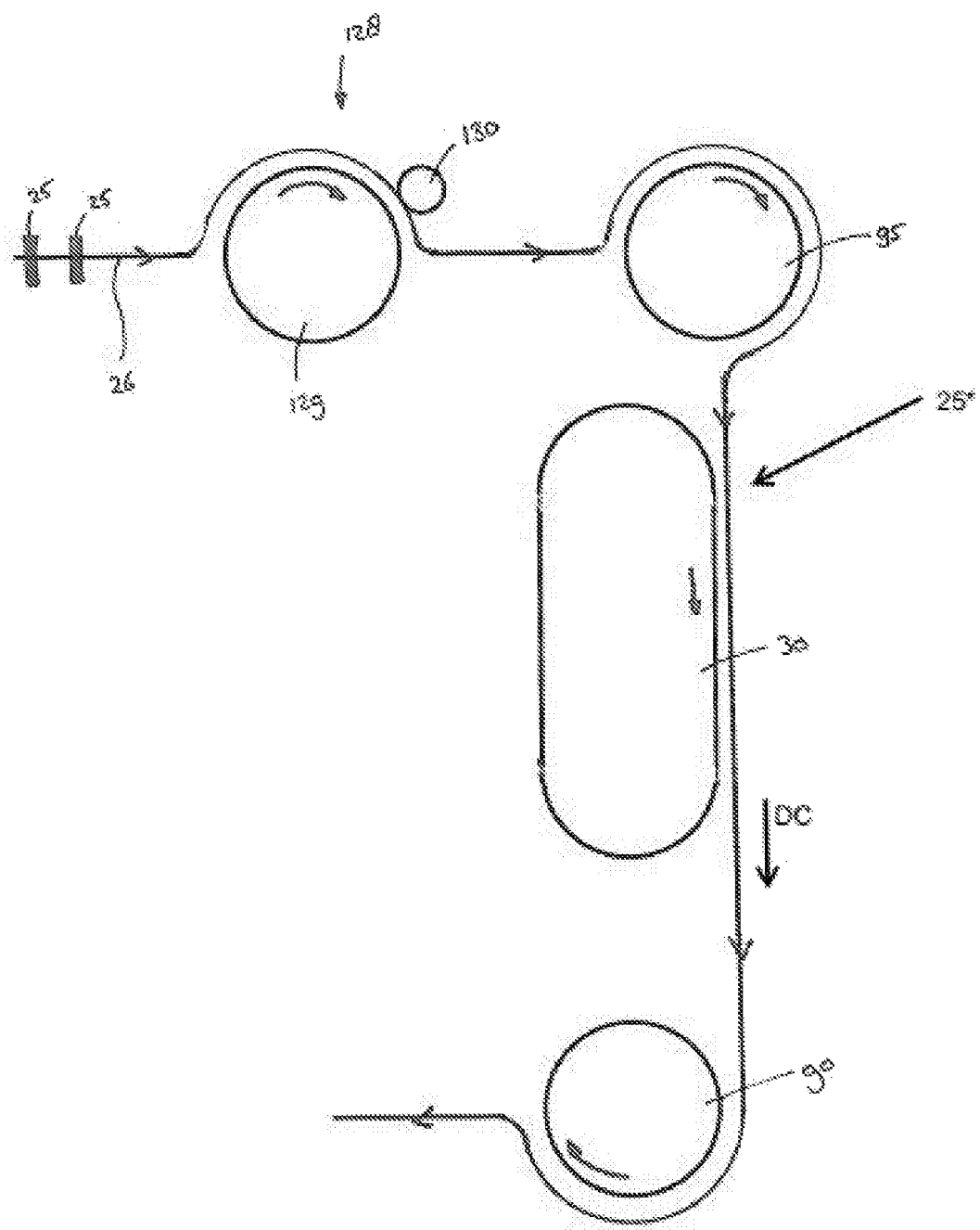
FIG. 26: illustrates shows a schematic top view of an exemplary embodiment of a system in which the system according to the invention is used.

FIG. 26 shows a schematic top view of an exemplary embodiment of a system in which the system according to the invention is used.

The system comprises a poultry products conveyor 25* with a track 26 and a plurality of poultry product carriers 25 at regular intervals along the track 26, e.g. as in WO93/13671, of which two are schematically indicated in FIG. 26. The poultry product carriers 25 are spaced apart from one another in the direction of the track 26 (indicated by the arrows) and which are movable along said track in a direction of conveyance DC. Each poultry product carrier 25 is adapted to hold at least one leg product 1 at the tarsal joint side end thereof such that the leg product is conveyed hanging from said poultry product carrier.

The exemplary embodiment of the system that is shown in FIG. 26 further comprises a knee cutter device 130, a thigh bone remover device 30 and a knee meat and thigh meat harvester device 90. These are all arranged along the track 26. The exemplary embodiment of the system that is shown in FIG. 26 further comprises a thigh deskinner device 95 which is also arranged along the track 26.

The thigh bone remover device 30 can be a thigh bone remover device in accordance with the invention.

The knee cutter device 130 forms part of a system 128 for making a knee cut in a leg product. This system further comprises a plurality of leg positioner devices which are arranged in a carrousel machine 129. The system 128 for making a knee cut in a leg product is for example a system in accordance with the second aspect of the invention.

In the exemplary embodiment of the system that is shown in FIG. 26, the thigh deskinner device 95, the thigh bone remover device 30 and the knee meat and thigh meat harvester device 90 are all designed as carrousel machine. They all have processing devices and/or positioning devices which are moveable along a loop-shaped path, e.g. a circular path, an elliptical path or a path made up out of a combination of straight lines and curved lines. These processing devices and/or positioning devices move along with the poultry product carriers 25 of the poultry product conveyor when the poultry product carriers 25 move past the knee cutter device 130, the thigh deskinner device 95, the thigh bone remover device 30 and the knee meat and thigh meat harvester device 90, respectively.

The invention claimed is:

1. A method for removing a thigh bone from a defeathered whole leg poultry product, the method comprising the steps of:
providing a defeathered whole leg poultry product which comprises:
a thigh comprising at least a thigh bone and thigh meat, wherein the thigh bone has a knee side end and a hip side end, and wherein the thigh bone comprises a knee side condyle;
a drumstick comprising at least a tibia bone and drumstick meat, wherein the tibia bone has a knee side end and a tarsal joint side end;
a knee joint comprising at least a connection between the thigh and the drumstick, wherein in the defeathered whole leg poultry product, a transverse cut has been provided at the knee joint that extends generally in a direction transverse to the thigh bone and the tibia bone, the transverse cut extending from one side of the defeathered whole leg poultry product to a cut end located adjacent to the opposite side of the defeathered whole leg poultry product so that the thigh and the drumstick are connected to each other, by which transverse cut a drumstick side cut plane and a thigh side cut plane are created;
while keeping the thigh and the drumstick connected to each other, changing the angle between the thigh and the drumstick by bending the defeathered whole leg poultry product at the knee joint and thereby opening the transverse cut at the knee joint and exposing the thigh side cut plane, during which bending the thigh meat remains on the thigh bone and the drumstick meat remains on the tibia bone; and while keeping the thigh meat and the drumstick connected to each other and while keeping the transverse cut at the knee joint bent open, removing the thigh bone from the thigh meat via the thigh side cut plane of the transverse cut at the knee joint.

2. The method according to claim 1, wherein the defeathered whole leg poultry product has a front side, which is the side on which in an unprocessed poultry leg in which the knee joint comprises a knee cap, said knee cap is naturally located, and a rear side, which is the side opposite to said front side, and wherein the transverse cut extends from the rear side of the defeathered whole leg poultry product to a cut end located adjacent to the front of the defeathered whole leg poultry product.

3. The method according to claim 1, wherein in the step of removing the thigh bone from the thigh meat via the thigh side cut plane of the transverse cut at the knee joint, a resilient scraper member comprising a central aperture is arranged adjacent to the thigh side cut plane of the transverse cut at the knee joint, and wherein the knee side condyle is forced through said central aperture by exerting a pushing force on the thigh bone, thereby severing thigh meat from the knee side condyle of the thigh bone.

4. The method according to claim 1, wherein in the step of removing the thigh bone from the thigh meat via the thigh side cut plane of the transverse cut at the knee joint, thigh meat is severed from a region of the thigh bone between the knee side condyle and the hip side end by scraping using at least one scraper, wherein said thigh meat is scraped from said region of the thigh bone in the direction from the knee side end towards the hip side end.

5. The method according to claim 1, wherein the thigh bone further comprises a hip side condyle at the hip side end, and wherein in the step of removing the thigh bone from the thigh meat via the thigh side cut plane of the transverse cut at the knee joint, a resilient scraper member comprising a central aperture is arranged adjacent to the thigh side cut plane of the transverse cut at the knee joint, and wherein the hip side condyle is forced through said central aperture by exerting a pulling force on the thigh bone, thereby severing thigh meat from the hip side condyle of the thigh bone.

6. The method according to claim 1, wherein the step of removing the thigh bone from the thigh meat via the thigh side cut plane of the transverse cut at the knee joint comprises:

arranging a resilient scraper member comprising a central aperture adjacent to the thigh side cut plane of the transverse cut at the knee joint;

forcing the knee side condyle through said central aperture by exerting a pushing force on the thigh bone, thereby severing thigh meat from the knee side condyle of the thigh bone;

engaging the thigh bone just behind the knee side condyle with a puller;

while exerting a pulling force on the thigh bone by the puller, scraping the thigh meat from a region of the thigh bone between the knee side condyle and the hip side end using a scraper, wherein the thigh meat is scraped from the thigh bone in a scraping direction from the knee side end towards the hip side end of the thigh bone; and, cutting through any remaining tissue connections between the hip side end of the thigh bone and the thigh meat.

7. The method according to claim 6, wherein the scraper that scrapes the thigh meat from the region of the thigh bone between the knee side condyle and the hip side condyle is activated by the knee side condyle.

8. The method according to claim 6, wherein the thigh bone further comprises a hip side condyle at the hip side end, wherein the thigh meat is scraped from a region of the thigh bone between the knee side condyle and the hip side condyle and wherein the method further comprises the step of:

after the scraping of the meat from the region of the thigh bone between the knee side condyle and the hip side condyle, forcing the hip side condyle through said central aperture by exerting a pulling force on the thigh bone, using the puller that engages the thigh bone just behind the knee side condyle, thereby severing thigh meat from the hip side condyle of the thigh bone.

9. The method according to claim 1, wherein the method further comprises the step of arranging the defeathered whole leg poultry product in a poultry product carrier of a poultry products conveyor, wherein the defeathered whole leg poultry product is suspended from said poultry product carrier, and wherein at least the steps of changing the angle between the thigh and the drumstick by bending the defeathered whole leg poultry product at the knee joint and thereby opening the transverse cut at the knee joint and exposing the thigh side cut plane and of removing the thigh bone from the thigh meat via the thigh side cut plane of the transverse cut at the knee joint are carried out while the defeathered whole leg poultry product is suspended from said poultry product carrier.

10. A system for removing a thigh bone from a defeathered whole leg poultry product, the defeathered whole leg poultry product comprising:

a thigh comprising at least a thigh bone and thigh meat, wherein the thigh bone has a knee side end and a hip side end, and wherein the thigh bone comprises a knee side condyle;

a drumstick comprising at least a tibia bone and drumstick meat, wherein the tibia bone has a knee side end and a tarsal joint side end;

a knee joint comprising at least a connection between the thigh and the drumstick, wherein in the defeathered whole leg poultry product, a transverse cut has been provided at the knee joint that extends generally in a direction transverse to the thigh bone and the tibia bone, the transverse cut extending from one side of the defeathered whole leg poultry product to a cut end located adjacent to the opposite side of the defeathered whole leg poultry product so that the thigh and the drumstick are connected to each other, by which transverse cut a drumstick side cut plane and a thigh side cut plane are created;

wherein the system comprises:

a poultry products conveyor, comprising:

a track; and a plurality of poultry product carriers spaced apart from one another in the direction of the track and movable along said track, wherein each poultry product carrier is adapted to hold at least one defeathered whole leg poultry product at the tarsal joint side end thereof such that the defeathered whole leg poultry product is conveyed hanging from said poultry product carrier; and
a thigh bone remover device arranged along the track of the poultry products conveyor, comprising:
a bender device adapted to engage the defeathered whole leg poultry product and bend the defeathered whole leg poultry product at the knee joint to a bent position, during which bending the thigh meat remains on the thigh bone and the drumstick meat remains on the tibia bone, by said bending changing the angle between the thigh and the drumstick, opening the transverse cut at the knee joint and exposing the thigh side cut plane while keeping the thigh and the drumstick connected to each other, the bender device being further adapted to keep the defeathered whole leg poultry product in the bent position; and
a thigh bone remover assembly is adapted to remove the thigh bone from the thigh meat via the thigh side cut plane of the transverse cut at the knee joint while the thigh meat and the drumstick are kept connected to each other and while the transverse cut at the knee joint is kept open by the bender device.

11. The system according to claim 10, wherein the thigh bone remover assembly comprises:
a resilient scraper member having a central aperture, the resilient scraper member being arrangeable adjacent to the thigh side cut plane of the transverse cut at the knee joint, the central aperture having a diameter that is variable between a minimum diameter and a maximum diameter, wherein the minimum diameter is smaller than the maximum diameter of a knee side condyle of the thigh bone, and wherein the central aperture is biased towards its minimum diameter; and
a thigh bone displacement assembly adapted to force the thigh bone through the central aperture while the transverse cut at the knee joint is kept open and the thigh and the drumstick are kept connected to each other, thereby severing thigh meat from the thigh bone.

12. The system according to claim 11, wherein the minimum diameter of the central aperture is larger than the thickness of the thigh bone in the region between the knee side condyle and the hip side condyle or hip side end.

13. The system according to claim 11, wherein the thigh bone displacement assembly comprises a pusher adapted to exert a pushing force on the thigh bone to force the knee side condyle of the thigh bone through the central aperture.

14. The system according to claim 10, wherein the thigh bone remover assembly comprises:
a scraper adapted to scrape the thigh meat from the thigh bone in a region between the knee side condyle and the hip side end, in the direction from the knee side end towards the hip side end; and
a puller adapted to exert a pulling force on the thigh bone in order to move the thigh bone relative to the scraper.

15. The system according to claim 14, wherein the thigh bone further comprises a hip side condyle, and wherein said puller is adapted to pull the hip side condyle of the thigh bone through the central aperture.

16. The system according to claim 14, wherein the thigh bone remover assembly comprises a scraper activator, the scraper activator being operated by the knee side condyle of the thigh bone.

17. The system according to claim 10, wherein the poultry product carrier comprises a pivot that allows to pivot the defeathered whole leg poultry product about a horizontal pivot axis when bending the defeathered whole leg poultry product.

18. The system according to claim 10, wherein the defeathered whole leg poultry product has a front side, which is the side on which in an unprocessed poultry leg in which the knee joint comprises a knee cap, said knee cap is naturally located, and a rear side, which is the side opposite to said front side,
wherein the transverse cut extends from the rear side of the defeathered whole leg poultry product to a cut end located adjacent to the front of the defeathered whole leg poultry product, and
wherein the bender device is adapted to rotate the drumstick relative to the thigh about the connection at the knee joint to a bent position in which the smallest angle between the thigh and the drumstick is on the front side of the defeathered whole leg poultry product.

19. The system according to claim 10, wherein the system further comprises a thigh meat harvester device arranged along the track of the poultry products conveyor downstream of the a thigh bone remover device, thigh meat harvester device comprising a cutter adapted to sever the thigh meat from the drumstick.

20. The system according to claim 10, further comprising a knee meat and thigh meat harvester device.

21. A method for removing a thigh bone from a poultry thigh comprising the steps of:
providing a poultry thigh comprising at least a thigh bone and thigh meat and a thigh side cut plane, wherein the thigh bone has a knee side end and a hip side end, and wherein the thigh bone comprises a knee side condyle;
arranging a resilient scraper member comprising a central aperture adjacent to the thigh side cut plane of the poultry thigh;
forcing the knee side condyle through said central aperture by exerting a pushing force on the thigh bone thereby severing thigh meat from the knee side condyle of the thigh bone;
engaging the thigh bone just behind the knee side condyle with a puller;
while exerting a pulling force on the thigh bone by the puller, scraping the thigh meat from a region of the thigh bone between the knee side condyle and the hip side end in the direction from the knee side condyle towards the hip side end, using a scraper; and
cutting through any remaining tissue connections between the hip side end of the thigh bone and the thigh meat.

22. The method according to claim 21, wherein the thigh bone further comprises a hip side condyle at the hip side end, wherein the thigh meat is scraped from a region of the thigh bone between the knee side condyle and the hip side condyle and wherein the method further comprises the step of:
after the scraping of the meat from the region of the thigh bone between the knee side condyle and the hip side condyle, forcing the hip side condyle through said central aperture by exerting a pulling force on the thigh bone, using the puller that engages the thigh bone just behind the knee side condyle, thereby severing thigh meat from the hip side condyle of the thigh bone.

23. A system for removing a thigh bone from a poultry thigh, the poultry thigh comprising at least a thigh bone and thigh meat and a thigh side cut plane, wherein the thigh bone has a knee side end and a hip side end, and wherein the thigh bone comprises a knee side condyle, the system comprising:

a resilient scraper member having a central aperture, the resilient scraper member being arrangeable adjacent to the thigh side cut plane, the central aperture having a diameter that is variable between a minimum diameter and a maximum diameter, wherein the minimum diameter is smaller than the maximum diameter of a knee side condyle of the thigh bone, and wherein the central aperture is biased towards its minimum diameter, and the minimum diameter of the central aperture is larger than the thickness of the thigh bone in the region between the knee side condyle and the hip side end;

a thigh bone displacement assembly adapted to force the thigh bone through the central aperture, thereby severing thigh meat from the thigh bone, the thigh bone displacement assembly comprising a pusher adapted to exert a pushing force on the thigh bone to force the knee side condyle of the thigh bone through the central aperture;

a scraper adapted to scrape the thigh meat from the thigh bone between the knee side condyle and the hip side end, in the direction from the knee side condyle towards the hip side end; and a puller adapted to exert a pulling force on the thigh bone in order to move the thigh bone relative to the scraper and wherein said puller is adapted to pull the hip side end of the thigh bone through the central aperture.

24. A system for removing a thigh bone from a poultry thigh, the poultry thigh comprising at least a thigh bone and thigh meat and a thigh side cut plane, wherein the thigh bone has a knee side end and a hip side end, and wherein the thigh bone comprises a knee side condyle and a hip side condyle, the system comprising:

a resilient scraper member having a central aperture, the resilient scraper member being arrangeable adjacent to the thigh side cut plane, the central aperture having a diameter that is variable between a minimum diameter and a maximum diameter, wherein the minimum diameter is smaller than the maximum diameter of a knee side condyle of the thigh bone, and wherein the central aperture is biased towards its minimum diameter, and the minimum diameter of the central aperture is larger than the thickness of the thigh bone in the region between the knee side condyle and the hip side condyle;

a thigh bone displacement assembly adapted to force the thigh bone through the central aperture, thereby severing thigh meat from the thigh bone, the thigh bone displacement assembly comprising a pusher adapted to exert a pushing force on the thigh bone to force the knee side condyle of the thigh bone through the central aperture;

a scraper adapted to scrape the thigh meat from the thigh bone between the knee side condyle and the hip side condyle in the direction from the knee side condyle towards the hip side end; and a puller adapted to exert a pulling force on the thigh bone in order to move the thigh bone relative to the scraper and wherein said puller is adapted to pull the hip side end of the thigh bone through the central aperture.

* * * * *